(12) United States Patent
Okada et al.

(10) Patent No.: US 11,733,403 B2
(45) Date of Patent: Aug. 22, 2023

(54) RADIOGRAPHIC IMAGING APPARATUS AND RADIOGRAPHIC IMAGING SYSTEM

(71) Applicant: CANON KABUSHIKI KAISHA, Tokyo (JP)

(72) Inventors: Hideyuki Okada, Saitama (JP); Kentaro Fujiyoshi, Irvine, CA (US); Yoshiaki Serizawa, Kanagawa (JP); Ryunosuke Bannai, Kanagawa (JP); Shuichi Fujita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/657,223

(22) Filed: Mar. 30, 2022

(65) Prior Publication Data
US 2022/0334272 A1 Oct. 20, 2022

(30) Foreign Application Priority Data

Apr. 16, 2021 (JP) .................................. 2021-069922

(51) Int. Cl.
 *G01T 1/20* (2006.01)
 *G01T 1/17* (2006.01)

(52) U.S. Cl.
 CPC ............ *G01T 1/20184* (2020.05); *G01T 1/17* (2013.01)

(58) Field of Classification Search
 CPC .............................. G01T 1/17; G01T 1/20184
 See application file for complete search history.

(56) References Cited

U.S. PATENT DOCUMENTS

| 8,878,972 | B2 | 11/2014 | Wayama |
| 9,048,154 | B2 | 6/2015 | Takenaka |
| 9,128,196 | B2 | 9/2015 | Sato |
| 9,134,432 | B2 | 9/2015 | Iwashita |
| 9,234,966 | B2 | 1/2016 | Sugawara |
| 9,270,903 | B2 | 2/2016 | Wayama |
| 9,277,896 | B2 | 3/2016 | Ofuji |
| 9,423,512 | B2 | 8/2016 | Sato |
| 9,423,513 | B2 | 8/2016 | Watanabe |
| 9,445,030 | B2 | 9/2016 | Yagi |

(Continued)

FOREIGN PATENT DOCUMENTS

JP 5737286 B2 6/2015

OTHER PUBLICATIONS

U.S. Appl. No. 16/103,150, Atsushi Iwashita, filed Aug. 14, 2018.

*Primary Examiner* — Blake C Riddick
(74) *Attorney, Agent, or Firm* — Venable LLP

(57) ABSTRACT

A radiographic imaging apparatus comprising pixels, a drive circuit configured to control the pixels through drive lines and a detection unit configured to detect a start of radiation irradiation is provided. The drive circuit comprises a shift circuit configured to perform a shift operation of changing the drive line to be activated, among the drive lines, in response to a shift control signal input to the drive circuit. The drive circuit has a mode of activating a second drive line among the drive lines in response to the shift control signal input for a second time after a first drive line among the drive lines is activated during a period up to when the detection unit detects the start of radiation irradiation, at least two drive lines of the drive lines being disposed between the first drive line and the second drive line.

19 Claims, 14 Drawing Sheets

(56) References Cited

U.S. PATENT DOCUMENTS

| | | |
|---|---|---|
| 9,462,989 B2 | 10/2016 | Takenaka |
| 9,468,414 B2 | 10/2016 | Ryu |
| 9,470,800 B2 | 10/2016 | Iwashita |
| 9,470,802 B2 | 10/2016 | Okada |
| 9,521,347 B2 | 12/2016 | Kawanabe |
| 9,541,653 B2 | 1/2017 | Iwashita |
| 9,625,585 B1 | 4/2017 | Yokoyama |
| 9,655,586 B2 | 5/2017 | Yagi |
| 9,661,240 B2 | 5/2017 | Fujiyoshi |
| 9,675,307 B2 | 6/2017 | Ofuji |
| 9,726,767 B2 | 8/2017 | Kawanabe |
| 9,737,271 B2 | 8/2017 | Iwashita |
| 9,812,474 B2 | 11/2017 | Yagi |
| 9,835,732 B2 | 12/2017 | Fujiyoshi |
| 9,838,638 B2 | 12/2017 | Furumoto |
| 9,885,790 B2 | 2/2018 | Okada |
| 9,948,871 B2 | 4/2018 | Wayama |
| 9,971,046 B2 | 5/2018 | Ryu |
| 9,977,135 B2 | 5/2018 | Yokoyama |
| 9,980,685 B2 | 5/2018 | Iwashita |
| 9,989,656 B2 | 6/2018 | Sato |
| 10,068,943 B2 | 9/2018 | Fujiyoshi |
| 10,197,684 B2 | 2/2019 | Terui |
| 10,274,612 B2 | 4/2019 | Ishii |
| 10,349,914 B2 | 7/2019 | Takenaka |
| 10,352,765 B2 | 7/2019 | Okada |
| 10,416,323 B2 | 9/2019 | Ryu |
| 10,473,801 B2 | 11/2019 | Kawanabe |
| 10,537,295 B2 | 1/2020 | Watanabe |
| 10,551,721 B2 | 2/2020 | Sato |
| 10,634,800 B2 | 4/2020 | Yokoyama |
| 10,716,522 B2 | 7/2020 | Sato |
| 10,779,777 B2 | 9/2020 | Terui |
| 10,782,251 B2 | 9/2020 | Sato |
| 10,914,849 B2 | 2/2021 | Ofuji |
| 10,992,883 B2 | 4/2021 | Kameshima |
| 11,047,808 B2 | 6/2021 | Iwashita |
| 11,047,995 B2 | 6/2021 | Yagi |
| 11,067,706 B2 | 7/2021 | Furumoto |
| 11,083,430 B2 | 8/2021 | Sato |
| 11,090,018 B2 | 8/2021 | Watanabe |
| 11,128,820 B2 | 9/2021 | Tamura |
| 11,154,261 B2 | 10/2021 | Okada |
| 11,157,059 B2 | 10/2021 | Yokoyama |
| 11,243,314 B2 | 2/2022 | Fujiyoshi |
| 11,280,919 B2 | 3/2022 | Takenaka |
| 11,294,078 B2 | 4/2022 | Miura |
| 2003/0081823 A1* | 5/2003 | Nonaka ................. G01T 1/2018 257/E27.001 |
| 2012/0001080 A1* | 1/2012 | Okada ..................... H04N 5/32 250/366 |
| 2012/0112081 A1* | 5/2012 | Tajima ................... H04N 25/75 250/370.08 |
| 2012/0201357 A1* | 8/2012 | Watanabe ................ H04N 5/32 378/114 |
| 2012/0217410 A1* | 8/2012 | Amitani ................ H04N 25/68 250/370.09 |
| 2013/0032696 A1 | 2/2013 | Tajima |
| 2013/0051524 A1* | 2/2013 | Sato ...................... G01T 1/2018 250/394 |
| 2013/0068961 A1* | 3/2013 | Tajima ................. A61B 6/4283 250/394 |
| 2013/0187059 A1* | 7/2013 | Muraoka ................... G01T 1/17 250/394 |
| 2013/0341525 A1* | 12/2013 | Maruta ..................... H04N 5/32 250/394 |
| 2013/0342514 A1 | 12/2013 | Yokoyama |
| 2014/0021365 A1* | 1/2014 | Oda ....................... A61B 6/548 250/336.1 |
| 2014/0112448 A1* | 4/2014 | Takenaka ............. H04N 25/767 378/114 |
| 2014/0154833 A1 | 6/2014 | Wayama |
| 2014/0239186 A1 | 8/2014 | Sato |
| 2014/0239188 A1* | 8/2014 | Tezuka ..................... H04N 5/32 250/394 |
| 2014/0346367 A1* | 11/2014 | Shikino .................... G01T 1/17 250/394 |
| 2014/0361189 A1 | 12/2014 | Kameshima |
| 2016/0161615 A1* | 6/2016 | Kawanabe ............... H04N 5/32 250/370.07 |
| 2016/0270755 A1 | 9/2016 | Takenaka |
| 2018/0013967 A1* | 1/2018 | Kuwabara ............ A61B 6/5258 |
| 2018/0063933 A1 | 3/2018 | Okada |
| 2020/0129138 A1* | 4/2020 | Iwakiri .................... A61B 6/56 |
| 2020/0145591 A1* | 5/2020 | Iwakiri .................... G01T 1/247 |
| 2020/0348424 A1 | 11/2020 | Watanabe |
| 2020/0359978 A1* | 11/2020 | Okada ...................... H05H 7/00 |
| 2020/0371259 A1* | 11/2020 | Miura .................... H04N 25/63 |
| 2021/0011176 A1 | 1/2021 | Ishinari |
| 2021/0041584 A1* | 2/2021 | Terui ................... H04N 5/3205 |
| 2021/0141105 A1* | 5/2021 | Ofuji .................... H04N 25/709 |
| 2022/0011452 A1 | 1/2022 | Ryu |
| 2022/0075085 A1 | 3/2022 | Kawanabe |
| 2022/0196859 A1 | 6/2022 | Fujiyoshi |

* cited by examiner

FIG. 9A

| | | | | | |
|---|---|---|---|---|---|
Vg1
Vg2
Vg3
Vg4
Vg5
Vg6
Vg7
Vg8
Vg9
Vg10
Vg11
Vg12
Vg13
Vg14
Vg15
Vg16

RADIOGRAPHIC IMAGING APPARATUS AND RADIOGRAPHIC IMAGING SYSTEM

BACKGROUND OF THE INVENTION

Field of the Invention

The present invention relates to a radiographic imaging apparatus and a radiographic imaging system.

Description of the Related Art

Radiographic imaging apparatuses including flat panel detectors (FPDs) composed of semiconductor material are widely used in medical diagnostic imaging and non-destructive inspection. Japanese Patent No. 5737286 discloses a radiographic image capturing apparatus that detects the start of radiation irradiation by performing reset processing of periodically and repeatedly reading out signals from multiple radiation detecting elements. When the reset processing is performed between the start of actual radiation irradiation and the detection of the radiation irradiation, a portion of the electrical charge generated by the irradiated radiation is discharged in the pixels to which the reset processing has been performed; and, as a result, a line defect may occur in the resulting image and cause a decrease in image quality. Japanese Patent No. 5737286 discloses that, to suppress line defects caused by the reset processing, the reset processing is performed so that a scanning line to which an ON voltage is applied to perform the reset processing is not disposed adjacent to the last scanning line to which the reset processing has been performed. Through such reset processing, lines that are not reset are disposed adjacent to the line that is reset in the period up to when the detection of the start of radiation irradiation; this can facilitate image correction and suppress line defects.

SUMMARY OF THE INVENTION

In the processing of Japanese Patent No. 5737286, a drive circuit shifts through scanning lines at least two at a time to select the scanning line to which the reset processing is to be performed; to maintain the operating speed of the drive circuit, it is necessary to operate the drive circuit at a higher speed than a case in which the scanning lines in every row are sequentially selected. An increase in the speed of the drive circuit may cause an increase in cost.

Some embodiments of the present invention provide a technique of a radiographic imaging apparatus that is advantageous for obtaining an image having satisfactory quality while suppressing an increase in cost.

According to some embodiments, a radiographic imaging apparatus comprising: a plurality of pixels disposed to form a plurality of rows and a plurality of columns; a drive circuit configured to control the plurality of pixels through a plurality of drive lines extending in a row direction; and a detection unit configured to detect a start of radiation irradiation, wherein, the drive circuit comprises a shift circuit configured to perform a shift operation of changing the drive line to be activated, among the plurality of drive lines, in response to a shift control signal input to the drive circuit, and the drive circuit has a mode of activating a second drive line among the plurality of drive lines in response to the shift control signal input for a second time after a first drive line among the plurality of drive lines is activated during a period up to when the detection unit detects the start of radiation irradiation, at least two drive lines of the plurality of drive lines being disposed between the first drive line and the second drive line, is provided.

According to some other embodiments, a radiographic imaging system comprising: a plurality of pixels disposed to form a plurality of rows and a plurality of columns; a drive circuit configured to control the plurality of pixels through a plurality of drive lines extending in a row direction; a detection unit configured to detect a start of radiation irradiation; and a bias source, wherein each of the plurality of pixels comprises a transducer that converts radiation to an electrical charge, the plurality of pixels are divided into at least two pixel groups connected to different drive lines among the plurality of drive lines, the drive circuit is configured to activate the plurality of drive lines in a predetermined order in each of the pixel groups during the period up to when the detection unit detects the start of radiation irradiation, pixels, among the plurality of pixels, adjacent to each other in a column direction belong to different pixel groups of the at least two pixel groups, pixels, among the plurality of pixels, adjacent to each other in a row direction belong to different pixel groups of the at least two pixel groups, the bias source is configured to supply a bias voltage to the transducers through electrically independent bias lines in one-to-one correspondence with the at least two pixel groups, and the detection unit is configured to detect the start of radiation irradiation based on a current flowing through the bias line, is provided.

Further features of the present invention will become apparent from the following description of exemplary embodiments (with reference to the attached drawings).

BRIEF DESCRIPTION OF THE DRAWINGS

FIGS. 9A to 9E are diagrams illustrating correction examples of signals from the radiographic imaging apparatus of FIG. 1.

BRIEF DESCRIPTION OF THE EMBODIMENTS

Figure 1:
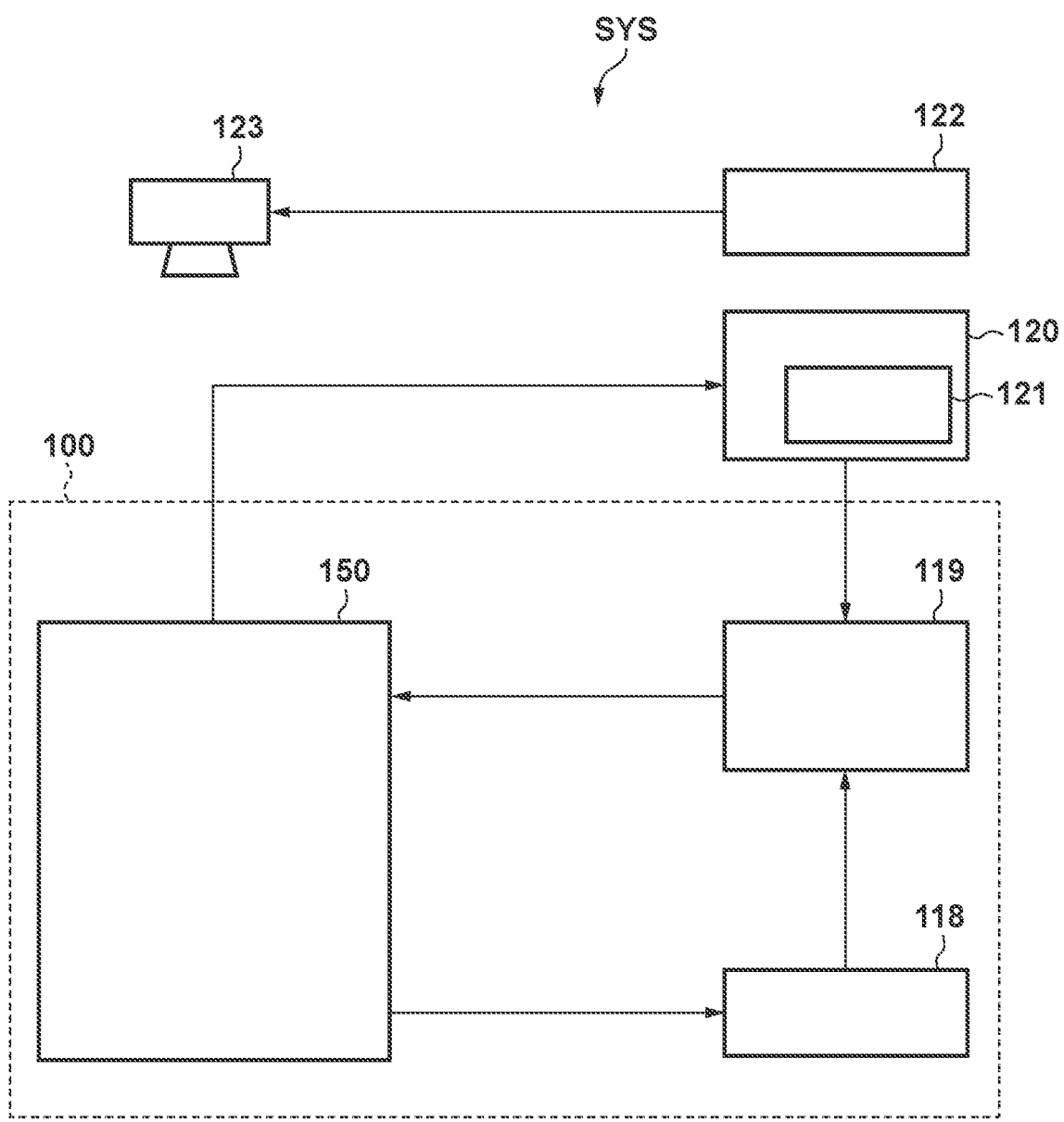
FIG. 1 is a block diagram illustrating a configuration example of a radiographic imaging system including a radiographic imaging apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The radiation in the present invention may include alpha rays, beta rays, gamma rays, and the like, which are beams generated by particles (including photons) emitted by radiation decay, and beams such as X-rays, particle rays, cosmic rays and the like having the same or higher energy as that of alpha rays, beta rays, gamma rays, and the like.

The configuration and the operation of the radiographic imaging apparatus according the present embodiment will now be described with reference to FIGS. 1 to 12. FIG. 1 is a block diagram illustrating a configuration example of a radiographic imaging system SYS including a radiographic imaging apparatus 100 according to the present embodiment. The radiographic imaging system SYS includes the radiographic imaging apparatus 100, a control computer 120, a radiation control device 122, and a radiation generating device 123.

The radiographic imaging apparatus 100 includes a radiation detection unit 150 for detecting radiation and generating an image signal corresponding to the incident radiation, a detection unit 118, and a control unit 119 for controlling the driving of the radiation detection unit 150 and radiation irradiation on the basis of exposure information. To acquire a radiographic image, the radiation detection unit 150 includes multiple pixels each including a transducer that converts radiation into an electrical charge. The pixels generate signals corresponding to the incident radiation. The detection unit 118 detects the presence or absence of radiation, e.g., the start of the irradiation of radiation, on the basis of the signals output from the radiation detection unit 150. The detection unit 118 may measure, for example, the dose of the incident radiation. The detection unit 118 may be a digital signal processing circuit, such as an FPGA, a DSP, or a processor, and calculate the signals output from the radiation detection unit 150 and detect the presence or absence of radiation. The detection unit 118 may include an analog circuit, such as a sample-and-hold circuit or an operational amplifier. In the configuration illustrated in FIG. 1, the detection unit 118 is included in the radiographic imaging apparatus 100. Alternatively, the function of the detection unit 118 may be provided by the control computer 120. The control unit 119 controls the radiation detection unit 150 on the basis of signals input from the control computer 120. The control unit 119 may use the information of the irradiation of radiation output from the detection unit 118 to change the driving method of the radiation detection unit 150.

The control computer 120 comprehensively controls the radiographic imaging system SYS. The control computer 120 may function as a user interface for a user (such as a radiology technician) to capture a radiographic image including the radiographic imaging system SYS. For example, a user inputs conditions for radiographic imaging to the control computer 120, and the control computer 120 controls the radiographic imaging apparatus 100 and the radiation generating device 123 in accordance with the input imaging conditions. The control computer 120 may further include a processor 121 for processing signals for generating a radiographic image output from the radiographic imaging apparatus 100. The control computer 120 processes the signal for generating a radiographic image output from the radiographic imaging apparatus 100, and causes the radiographic image captured by the radiographic imaging apparatus 100 to appear on a display device, such as a display unit included in the control computer 120 or an external display.

The radiation control device 122 controls the radiation generating device 123 in accordance with the signals output from the control computer 120. The radiation generating device 123 emits radiation in accordance with the signals output from the radiation control device 122.

Figure 2:
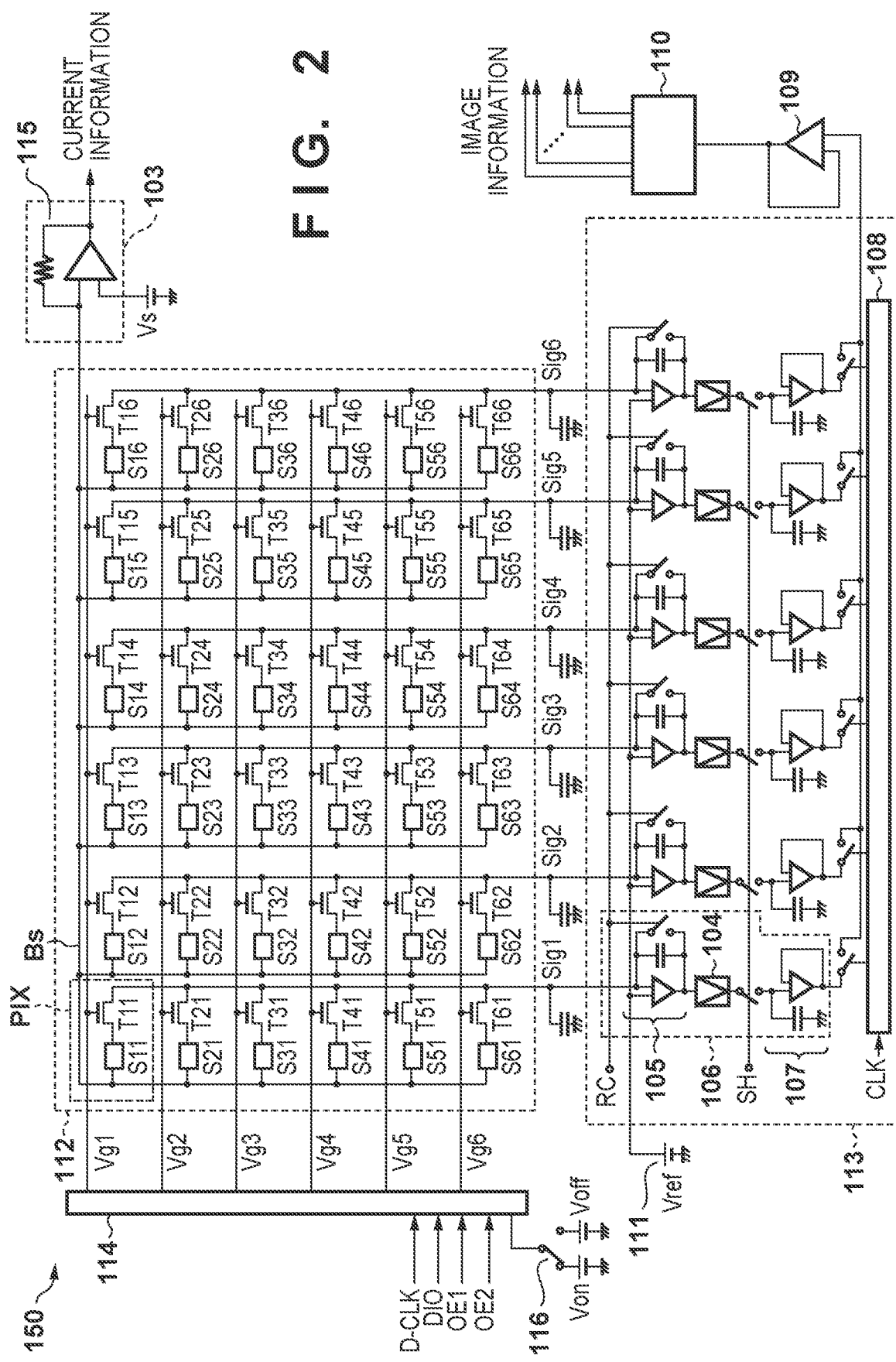
FIG. 2 is a diagram illustrating a configuration example of the radiographic imaging apparatus of FIG. 1.

FIG. 2 is a diagram illustrating a configuration example of the radiation detection unit 150. The radiation detection unit 150 includes a pixel unit 112 including multiple pixels PIX arranged in a matrix of multiple rows and columns. The pixels PIX each includes a transducer for converting radiation into an electrical charge. A drive circuit 114 controls the pixels PIX through multiple drive lines Vg extending in a row direction. Here, the row direction is the horizontal direction in FIG. 2. The direction intersecting the row direction is referred to as the column direction and is the vertical direction in FIG. 2.

For example, the radiation detection unit 150 may be composed of multiple pixels PIX arrayed in a two-dimensional matrix. The pixels PIX each consist of a combination of a switching element T, such as a TFT, and a photoelectric transducer. For example, a scintillator is formed on the pixel PIX. In such a case, the radiation incident on the radiation detection unit 150 is converted by the scintillator into light having a wavelength that can be converted by the transducer (for example, visible light). The light converted by the scintillator enters the photoelectric transducer of the corresponding pixel PIX, and the photoelectric transducer generates an electrical charge corresponding to the incident light. In the present embodiment, an indirect transducer S that converts incident radiation into an electrical charge with the scintillator and the photoelectric transducer is described as a configuration example. However, the transducer S is not limited to an indirect transducer. For example, the transducer S may be a so-called direct conversion type transducer that directly converts incident radiation into an electrical charge. The radiation detection unit 150 reads out and accumulates electrical charges the pixels by switching between an ON (conductive) state and an OFF (non-conductive) state of the switching element T, to acquire a radiographic image.

For simplification of the description, the radiation detection unit 150 illustrated in FIG. 2 includes a pixel unit 112 including pixels PIX of six rows by six columns. However, the actual pixel unit 112 may include more pixels PIX. For example, a 17-inch pixel unit 112 may include pixels PIX of about 3000 rows by about 3000 columns. The radiation detection unit 150 is a two-dimensional detector including a pixel unit 112 including multiple pixels PIX arranged in a matrix. The pixels PIX each includes a transducer S (S11 to S66) for converting radiation to an electrical charge and a switching element T (T11 to T66) for outputting an electrical signal corresponding to the electrical charge generated by the corresponding transducer S.

In the present embodiment, the transducer S includes a scintillator (wavelength conversion element) for converting the radiation emitted as described above into light, and an MIS or PIN type photodiode (photoelectric transducer) for converting the light converted by the scintillator into an electrical charge. As described above, the transducer S may be a direct type transducer that converts radiation directly into an electrical charge. The switching element T may be a transistor having a control terminal and two main terminals. In the present embodiment, the switching element T is a thin film transistor (TFT). One electrode of the transducer S is electrically connected to one of the two main terminals of the switching element T, and the other electrode is electrically connected to a bias source 103 through a common bias line Bs.

In the configuration illustrated in FIG. 2, the multiple switching elements T, i.e., the switching elements T11 to T16, disposed along the row direction are connected to a drive line Vg1 of the drive lines Vg extending along the row direction, and the switching elements T21 to T26 are connected to a drive line Vg2. Similarly, the switching elements T of the pixels PIX aligned along the row direction are connected to the same drive line Vg. The drive circuit 114 activates the drive lines Vg to bring the switching elements T connected to the drive lines Vg into a conductive state. The signals generated by the pixels PIX are read out to a readout circuit 113 through multiple column signal lines Sig extending in the column direction.

In the readout circuit 113, amplifier circuits 106 for amplifying the signals output in parallel from the pixel unit 112 are provided to correspond to the respective column signal lines Sig. The amplifier circuits 106 each includes an operational amplifier unit 105 for amplifying the signals output from the corresponding pixels PIX, a variable amplifier 104 for amplifying the output of the operational amplifier unit 105, and a sample-and-hold circuit 107 for sampling and holding an electrical signal amplified by the variable amplifier 104.

The operational amplifier unit 105 includes an amplifier, an integration capacitance, and a reset switch for amplifying and outputting signals read from the pixels PIX. The operational amplifier unit 105 can change the amplification factor by changing the value of the integration capacitance. In the amplifier of the operational amplifier unit 105, the inverting input terminal receives a signal output from the pixels PIX, the non-inverting input terminal receives a reference voltage Vref from a reference power source 111, and the output terminal outputs an amplified signal. The integration capacitance is disposed between the inverting input terminal and the output terminal of the amplifier of the operational amplifier unit 105. The sample-and-hold circuit 107, which is disposed in each amplifier circuit 106, includes a sampling switch and a sampling capacity.

The readout circuit 113 includes a multiplexer 108 that sequentially outputs the signals read in parallel from the amplifier circuit 106 as series signals, and a buffer amplifier 109 that impedance-converts and outputs the series signals output from the multiplexer 108. A signal Vout or analog electrical signal output from the buffer amplifier 109 is converted into a digital signal by an A/D converter 110 and supplied to the control computer 120 as image information.

A power supply unit (not illustrated) transforms battery power and external power into voltages corresponding to the respective power supplies, and supplies the power to the reference power source 111 and the bias source 103 illustrated in FIG. 2. The reference power source 111 supplies the reference voltage Vref to the non-inverting input terminal of the amplifier of the operational amplifier unit 105. The bias source 103 supplies a common bias voltage Vs to the transducers S via the bias line Bs. In the present embodiment, the bias source 103 outputs current information including the time variation of the amount of current supplied to the bias line Bs to the detection unit 118. In the present embodiment, a current-voltage conversion circuit 115 including an operational amplifier and a resistor is used as a circuit for outputting current information, but the configuration is not limited thereto. For example, a current-voltage conversion circuit including a shunt resistor may be used as a circuit for outputting current information. The circuit for outputting the current information may output current information as a digital value by using an A/D conversion circuit that converts the output voltage of the current-voltage conversion circuit into a digital value. The circuit for outputting the current information may output a physical quantity corresponding to the amount of current supplied to the bias line Bs as the current information.

The drive circuit 114 of the radiation detection unit 150 outputs a drive signal including a conductive voltage Vcom for bringing the switching elements T to a conductive state and a non-conductive voltage Vss for bringing the switching elements T to a non-conductive state to the respective drive lines Vg in response to control signals D-CLK, OE, and DIO input from the control unit 119. In this way, the drive circuit 114 controls the conductive state or the non-conductive state of the switching elements T and drives the pixels PIX of the pixel unit 112. As described above, the state in which the conductive voltage Vcom for bringing the switching elements T to the conductive state is supplied to the drive lines Vg is referred to as DOI the state of activated drive lines Vg.

The control signal D-CLK is a shift clock of a shift register used in the drive circuit 114. The control signal DIO is a signal for selecting the drive line Vg to which the conductive voltage Vcom is to be applied. The control signal OE is a signal for controlling a switch circuit unit of the output terminal of the drive circuit 114. Through these signals, the control unit 119 sets the required time for driving the pixel unit 112 and the scanning direction via the drive circuit 114. The control unit 119 controls the operation of each component of the readout circuit 113 by providing the readout circuit 113 with control signals RC, SH, and CLK. Here, the control signal RC controls the operation of a reset switch of the operational amplifier unit 105. The control signal SH controls the operation of the sample-and-hold circuit 107. The control signal CLK controls the operation of the multiplexer 108.

Figure 3:
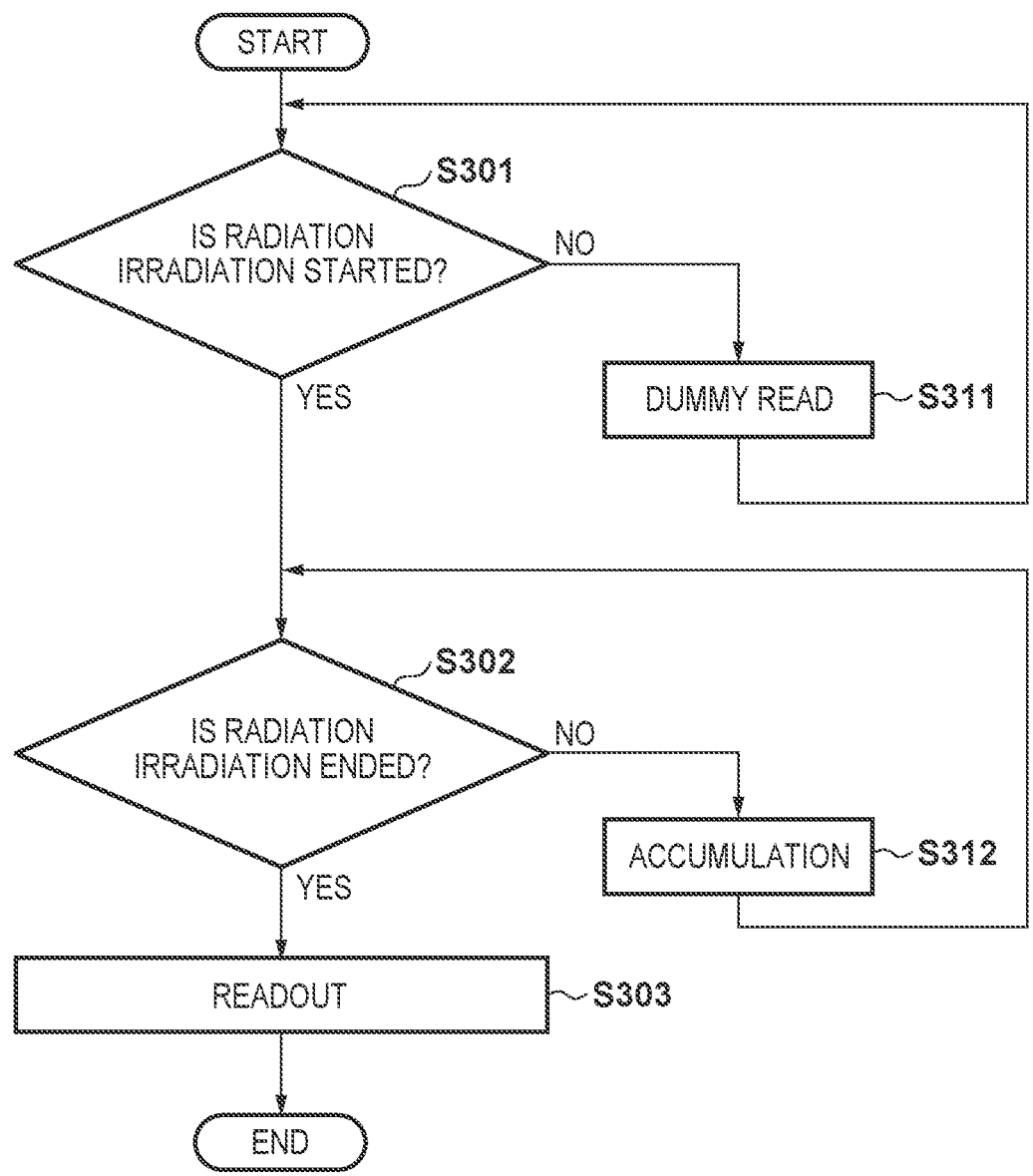
FIG. 3 is a flowchart for explaining an operation of the radiographic imaging system including a radiographic imaging apparatus of FIG. 1.

FIG. 3 is a flow diagram illustrating an operation example of the radiographic imaging system SYS according to the present embodiment. In step S301, the detection unit 118 detects the start of radiation irradiation on the basis of the current information output from the bias source 103. As a method of detecting the start of radiation irradiation, the start of the radiation irradiation may be determined when the current flow exceeds a predetermined threshold value based on the current flowing through the bias line Bs. If radiation irradiation is not started (NO in step S301), reset driving is repeated to remove electrical charges generated by the accumulation of a dark current or the like from the transducers S (hereinafter, this operation is also referred to as dummy read operation) (step S311). The dummy reading performed during the period up to when the detection unit 118 detects the start of radiation irradiation will be described later.

If radiation irradiation is started (YES in step S301), the radiographic imaging apparatus 100 (radiographic imaging system SYS) transitions to step S302. In step S302, the radiographic imaging apparatus 100 determines the end of the radiation irradiation. For example, the end of radiation irradiation may be determined when a predetermined time elapses from the start of the radiation irradiation. Alternatively, for example, the detection unit 118 may detect the end of radiation irradiation on the basis of the current information output from the bias source 103. As a method of detecting the end of radiation irradiation by the detection unit 118, the end of radiation irradiation may be determined when the current flowing through the bias line Bs falls below a predetermined threshold value. If the radiation irradiation continues (NO in step S302), the switching elements T of the pixels PIX arranged in the pixel unit 112 are brought to a non-conductive state, signals resulting from the radiation incident on the transducers S are accumulated (hereinafter, this operation may also be referred to an accumulation operation) (step S312). If the radiation irradiation ends (YES in step S302), the process proceeds to step S303, and driving is performed to read out the electrical charges generated by the pixels PIX arranged in the pixel unit 112 as radiographic image signals (hereinafter, this operation may also be referred to as a readout operation). For example, the readout operation may be performed sequentially from the first to the last pixel rows arranged in the pixel unit 112. That is, after the end of the radiation irradiation, the drive circuit 114 may sequentially activate the drive lines Vg one by one in the column direction to read out signals from the respective pixels PIX. When the readout operation reaches the last row of the pixel rows arranged in the pixel unit 112, the series of imaging operations ends.

Figure 4A:
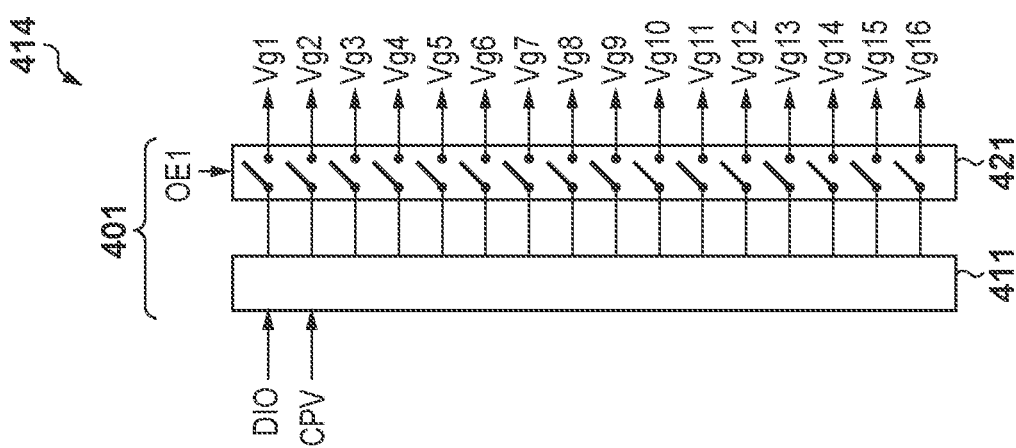
FIGS. 4A to 4C are diagrams illustrating configuration examples of the drive circuit of the radiographic imaging apparatus of FIG. 1.
Figure 4B:
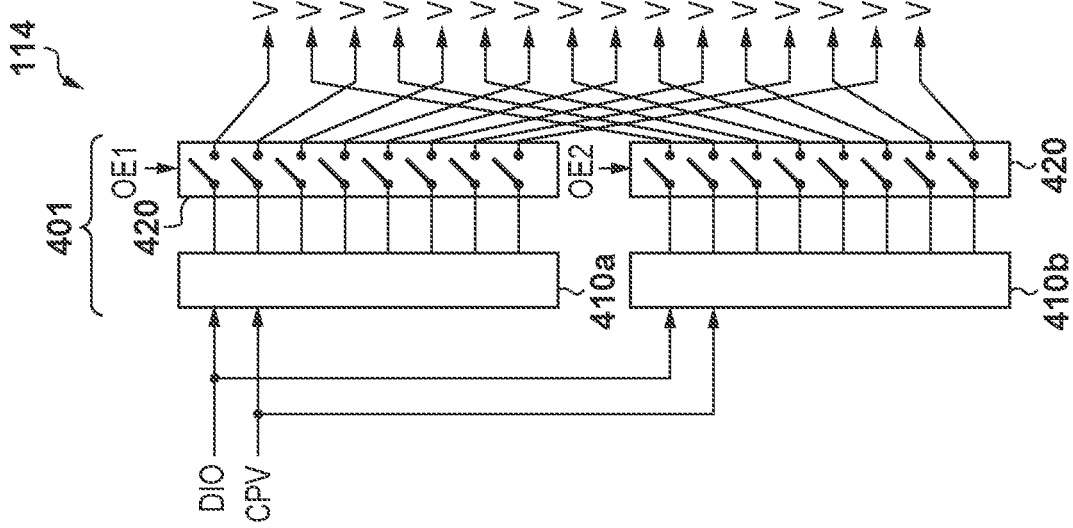
Figure 4C:
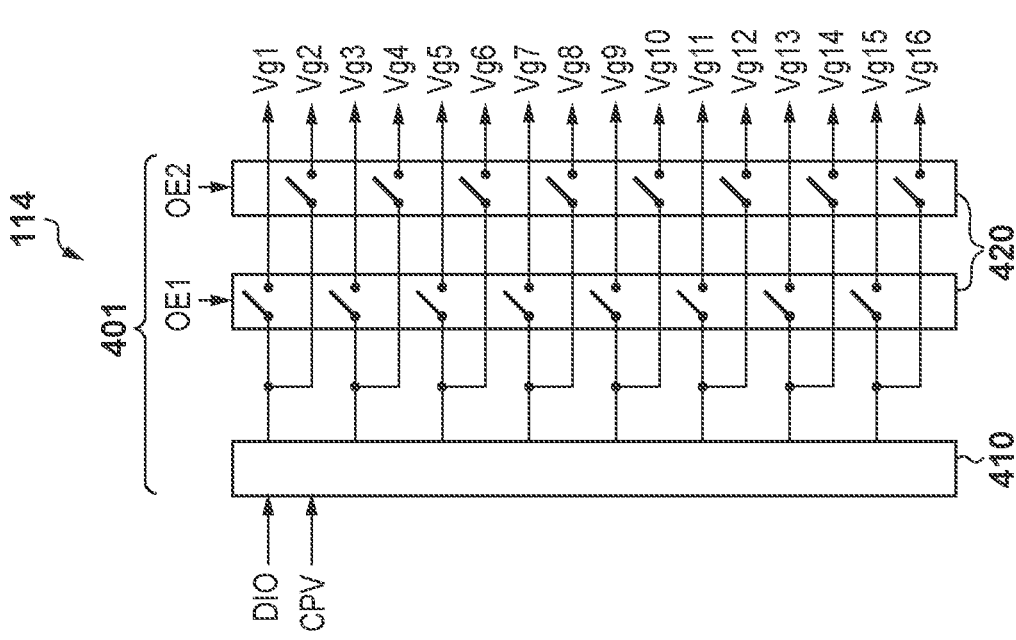

The drive circuit 114 of the present embodiment will now be described with reference to FIGS. 4A to 4C. FIGS. 4A and 4B illustrate configuration examples of the drive circuit 114 of the present embodiment, and FIG. 4C illustrates a configuration example of a drive circuit 414 of a comparative example. The drive circuit 114 includes a shift circuit 401 for performing a shift operation for changing the activated drive line Vg among the multiple drive lines Vg in response to a shift control signal CPV input to the drive circuit 114. In the configuration illustrated in FIG. 2, six drive lines Vg are illustrated. However, in the drawings referenced below, 16 drive lines Vg are illustrated for the sake of illustration.

As illustrated in FIGS. 4A and 4B, the shift circuit 401 is able to activate drive lines Vg that are not adjacent to each other among the multiple drive lines Vg in response to the shift control signal CPV being input one time. More specifically, as illustrated in FIG. 4A, the shift circuit 401 includes a shift register 410 having multiple output terminals for outputting an activation signal (conductive voltage Vcom) for activating the respective drive lines Vg, and a switch circuit unit 420 disposed between the output terminals of the shift register 410 and the multiple drive lines Vg. The shift register 410 shifts the output terminals that output an activation signal (conductive voltage Vcom) in response to an input of the shift control signal CPV. At least two drive lines Vg (for example, the drive lines Vg1 and Vg2) among the multiple drive lines Vg are connected to a same output terminal among the multiple output terminals of the shift register 410 via the switch circuit unit 420. Here, the switch circuit unit 420 is able to independently supply an activation signal to the drive lines Vg1 and Vg2 in accordance with control signals OE1 and OE2 supplied from the control unit 119.

The configuration of the shift circuit 401 is not limited to that illustrated in FIG. 4A. Even with the configuration illustrated in FIG. 4B, the drive lines Vg not adjacent to each other among the multiple drive lines Vg can be activated in response to the shift control signal CPV being input one time. More specifically, the shift circuit 401 includes at least two shift registers 410a and 410b for shifting the output terminals that output an activation signal (conductive voltage Vcom) in response to an input of a common shift control signal CPV, and a switch circuit unit 420 disposed between the at least two shift registers 410a and 410b and the multiple drive lines Vg. Here, the switch circuit unit 420 is able to select one of the at least two shift registers 410a and 410b that outputs an activation signal (conductive voltage Vcom), which activates the drive lines Vg, to the corresponding drive lines among the multiple drive lines Vg in accordance with the control signals OE1 and OE2.

The drive circuit 414 of the comparative example includes a 16-ch shift register 411, while the drive circuit 114 of the present embodiment includes an 8-ch shift register 410. The switch circuit unit 420 of the present embodiment operates in accordance with the control signals OE1 and OE2, while the switch circuit unit 421 of the comparative example operates in accordance with a control signal OE1.

Here, the drive circuits 114 illustrated in FIGS. 4A and 4B need not be mutually exclusive. For example, the drive circuit 114 may have a configuration capable of switching between the circuit configurations illustrated in FIGS. 4A and 4B by a setting switching circuit or the like.

The driving timing of the drive circuit 114 of the present embodiment will now be described with reference to FIG. 5. In the present embodiment, the detection unit 118 detects the start of radiation irradiation while performing the reset processing (dummy read operation) of multiple pixels PIX. At this time, if pixels PIX are reset during the period between the start of the actual radiation irradiation and the detection of the radiation irradiation by the detection unit 118, a portion of the electrical charges generated by the radiation irradiation is discharged from the reset pixels PIX, and a line defect may occur in the resulting image. Accordingly, similar to the operation described in Japanese Patent No. 5737286, the control unit 119 divides the drive lines Vg into two groups and sequentially activates the drive lines Vg1 to Vg15 of the odd-numbered rows during the period before the detection of the start of radiation irradiation. After the end of the activation of the drive line Vg15, the drive lines Vg2 to Vg16 of the even-numbered rows are sequentially activated. By repeating this operation, the dummy read operation for resetting the pixels PIX in every other row is repeated.

When the detection unit 118 detects the start of radiation irradiation, the control unit 119 inactivates the drive lines Vg to perform an accumulation operation for making the switching elements T of all pixels PIX in the pixel unit 112 non-conductive. The accumulation operation is continued until the radiation irradiation ends. In the example illustrated in FIG. 5, the drive line Vg being activated when the detection unit 118 determined the start of radiation irradiation is the drive line Vg9.

The current flowing through the bias line Bs during the period up to when the detection unit 118 detects radiation irradiation will now be described. When the radiation generating device 123 starts radiation irradiation, a current corresponding to the electrical charges accumulated in the transducers S flows to the bias line Bs during the period from the start of irradiation to the energization of the switching elements T. In the example illustrated in FIG. 5, radiation irradiation is started when the drive line Vg5 is being activated by the drive circuit 114. The drive lines Vg5, Vg7, and Vg9 are sequentially activated from the start of radiation irradiation by the radiation generating device 123. At the timing the driving line Vg9 is activated, the detection unit 118 detects the start of radiation irradiation because the current flowing through the bias line Bs exceeds a predetermined threshold value. For this reason, when the signals output from the pixels PIX connected to the drive lines Vg5, Vg7, and Vg9 among the multiple pixel PIX are used for a radiographic image, the signals may cause lowering of image quality. However, as in Japanese Patent No. 5737286, pixel rows that are not reset are disposed adjacent to pixel rows that are reset during the period between the start of radiation irradiation and the detection of the start by the detection unit 118. This arrangement facilitates image correction and can suppress line defects.

The effect of the drive circuit 114 of the present embodiment will now be described. As described above, the activation control of the drive lines Vg by the drive circuit 114 illustrated in FIG. 5 is periodic control of two drive lines Vg. At this time, the shift circuit 401 of the drive circuit 114 of the present embodiment is able to activate drive lines Vg not adjacent to each other among the multiple drive lines Vg in response to the shift control signal CPV being input one time. For example, the shift circuit 401 of the drive circuit 114 can select every third line among the drive lines Vg to be activated in response to the shift control signal CPV being input one time.

The control by the drive circuit 114 of the present embodiment will now be described with reference to FIG. 5. FIG. 5 illustrates the control signals DIO, OE1 and the shift control signal CPV of the comparative example, and the control signals DIO, OE1, and OE2 and the shift control signal CPV of the present embodiment. First, an operation for activating the drive line Vg1 is performed during the period up to when the detection unit 118 detects the start of radiation irradiation. At the beginning of the scanning of the drive lines Vg of the odd-numbered rows, one pulse of the shift control signal CPV is supplied for the control signal DIO in both the comparative example and the present embodiment. This causes an activation signal (conductive voltage Vcom) to be supplied to the output terminal connected to the drive line Vg1 among the output terminals of the shift register 410, and then the control signal OE1 is supplied to the switch circuit unit 420 to activate the drive line Vg1. This resets the pixels PIX connected to the drive line Vg1.

Next, the drive line Vg3 is activated. At this time, in the comparative example, the shift control signal CPV is supplied two times after the control signal OE1 falls, and, as a result, the output terminal connected to the drive line Vg3 is selected from the multiple output terminals of the shift register 410. Subsequently, the shift control signal CPV is supplied two times to sequentially select the drive line Vg to be activated. In contrast, the shift circuit 401 of the drive circuit 114 of the present embodiment sequentially selects the drive line Vg to be activated by inputting the control signal CPV one time.

In other words, the drive circuit 114 of the present embodiment can execute the operation involving the supply of the shift control signal CPV at twice the speed of that of the drive circuit 414 of the comparative example because the supply of the shift control signal CPV is reduced by half. That is, the radiographic imaging apparatus 100 of the present embodiment can increase the speed of the dummy read operation compared with that of the comparative example using the drive circuit 414. The drive circuit 114 of the present embodiment can execute the operation involving the supply of the shift control signal CPV at half the speed of the drive circuit 414 of the comparative example because the supply of the shift control signal CPV is reduced by half. An increase in the operating speed of the drive circuit 114 can lead to an increase in the cost of the semiconductor manufacturing process when the drive circuit 114 is manufactured. The drive circuit 114 of the present embodiment can suppress the operating speed more than the drive circuit 414 of the comparative example. Therefore, the drive circuit 114 of the present embodiment can be manufactured at a lower cost.

Figure 5:
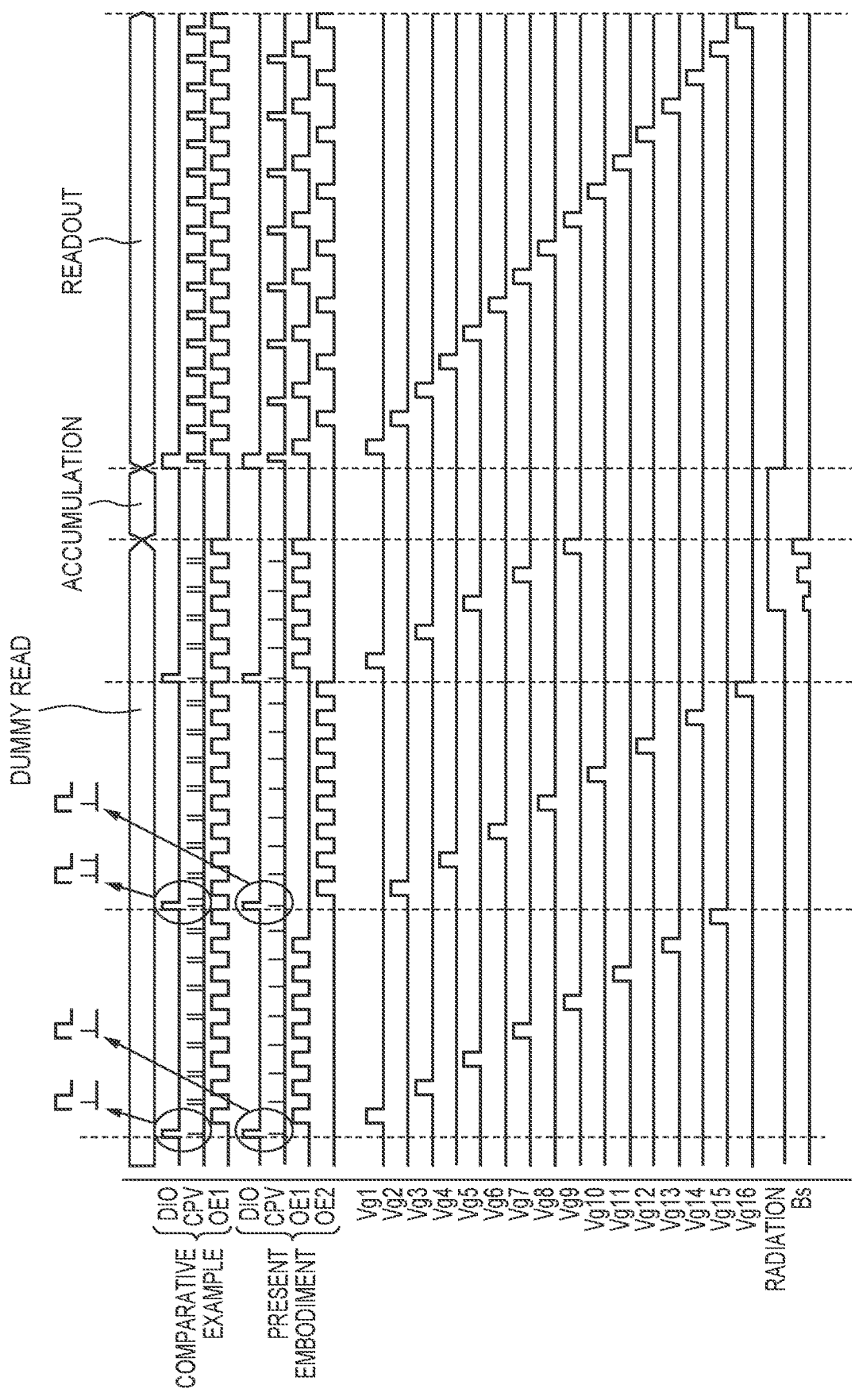
FIG. 5 is a timing diagram for explaining an operation of the radiographic imaging apparatus of FIG. 1.

In the operation illustrated in FIG. 5, the drive lines Vg of the odd-numbered rows are activated, and then the drive lines Vg of the even-numbered rows are activated. Thus, the control signal OE1 is sequentially supplied to the drive circuit 114 while the drive lines Vg of the odd-numbered rows are being activated, and the control signal OE2 is sequentially supplied to the drive circuit 114 while the drive lines Vg of the even-numbered rows are being activated. However, the supply of signals is not limited to this. For example, the control signals OE1 and OE2 may be alternately supplied after the shift control signal CPV is supplied one time. In such a case, for example, the drive lines Vg are activated in the following order: drive lines Vg1, Vg4, Vg5, Vg8, Vg9, Vg12, Vg13, Vg16, Vg2, Vg3, Vg6, Vg7, Vg10, Vg11, Vg14, and Vg15. In such a case, the speed at which the control signals OE1 and OE2 are supplied can be halved from the speed at which the control signal OE1 of the comparative example is supplied. In this way, it is possible to further reduce the cost of the manufacturing process of the drive circuit 114.

As described above, in the present embodiment, the drive circuit 114 has a mode of activating the drive line Vg5, which is disposed with at least two drive lines Vg between the drive line Vg1, among the multiple drive lines Vg during the period up to when the detection unit 118 detects the start of radiation irradiation, in response to the shift control signal CPV being input for the second time after a drive line (here, which is the drive line Vg1) among the multiple drive lines Vg is activated. In the present embodiment, at least three drive lines Vg are disposed between the drive lines Vg to be activated by the shift control signal CPV being input two times. Since the shift circuit 401 of the drive circuit 114 is able to activate drive lines Vg that are not adjacent to each other among the multiple drive lines Vg in response to the shift control signal CPV being input one time, a cost increase in the manufacturing of the radiographic imaging apparatus 100 can be suppressed. Furthermore, since the pixel rows in which the pixels PIX are arranged at appropriate intervals are sequentially reset while the dummy read operation is performed, the correction of the acquired radiographic image signals is facilitated, and an image of satisfactory image quality in which the influence of signal deterioration caused by the reset can be reduced.

Figure 6:
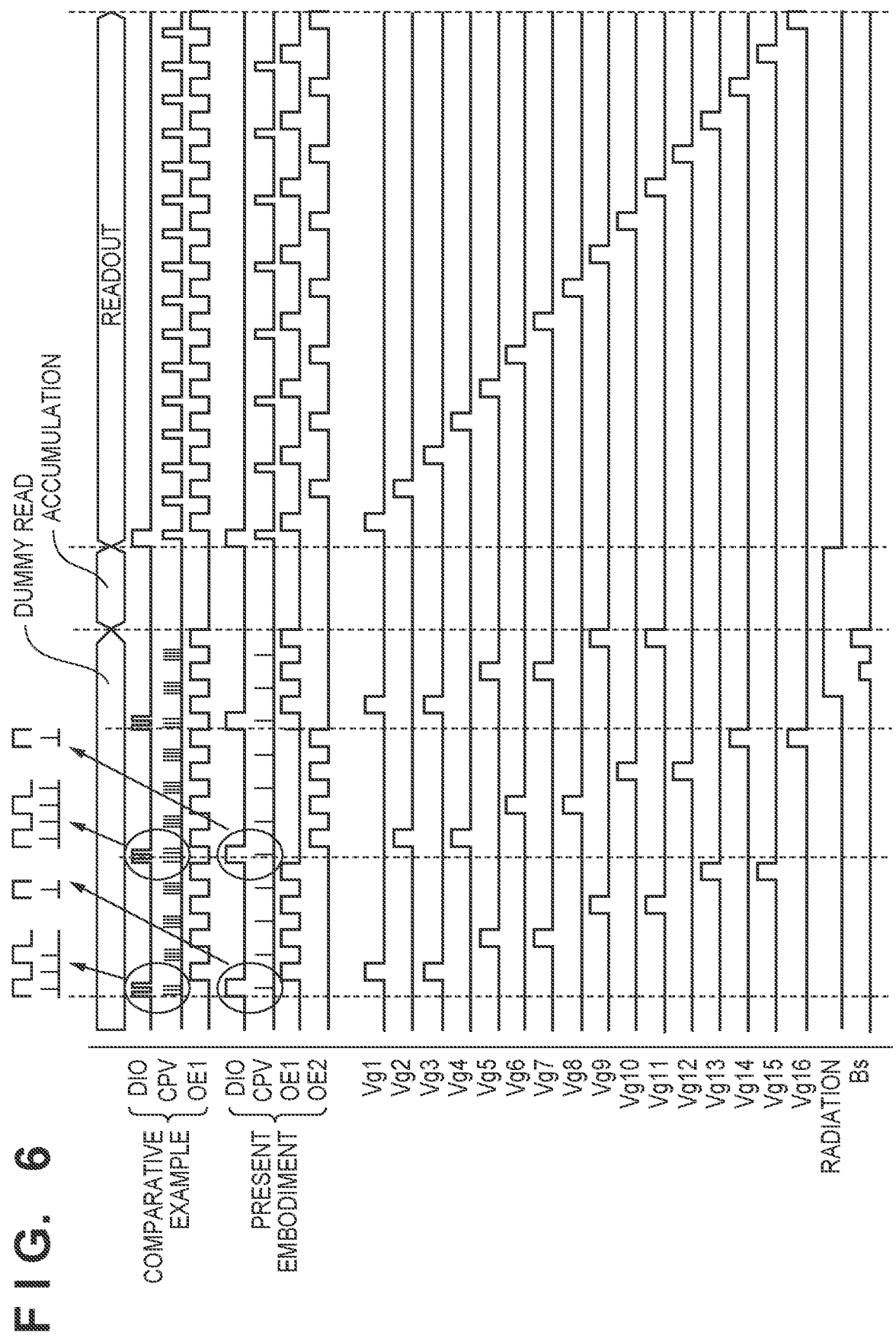
FIG. 6 is a timing diagram for explaining an operation of the radiographic imaging apparatus of FIG. 1.

The number of drive lines Vg activated and the number of pixel rows reset at once in the dummy read operation is not limited one drive line Vg and one pixel row. FIG. 6 illustrated an example in which the drive circuit 114 simultaneously activates two or more drive lines Vg among the multiple drive lines Vg during the period up to when the detection unit 118 detects the start of radiation irradiation. Although the details will be described later, it is presumed that the multiple pixels PIX are divided into at least two pixel groups connected to different drive lines Vg among the multiple drive lines Vg. In this example, the drive circuit 114 simultaneously activates two or more drive lines Vg connected to pixels belonging to the same pixel group, among the multiple drive lines Vg. In the example illustrated in FIG. 6, the pixels PIX are divided into a pixel group connected to the drive lines Vg of the odd-numbered rows and a pixel group connected to the drive lines Vg of the even-numbered rows.

In the drive operation illustrated in FIG. 6, two drive lines Vg are simultaneously activated. Thus, the pixel unit 112 can be scanned (dummy read operation) at a frame rate twice as high as that of the drive operation illustrated in FIG. 5. Since the number of drive lines Vg activated is doubled, the number of switching elements T to be turned on is doubled, and the amount of current flowing through the bias line BS can be doubled. That is, the detection unit 118 can detect the start of radiation irradiation in a shorter time even if the radiation is weak. This shortens the period between the start of radiation irradiation by the radiation generating device 123 and the detection of the radiation by the detection unit 118, and reduces the number of pixel rows to be reset during this period. That is, it is possible to suppress a decrease in image quality caused by the resetting of the pixels PIX during the dummy read operation.

Similar to FIG. 5, FIG. 6 illustrates the control signals DIO and OE1 and the shift control signal CPV of the comparative example, and the control signals DIO, OE1, and OE2, and the shift control signal CPV of the present embodiment. During the period up to when the detection unit 118 detects the start of radiation irradiation, an operation for activating the drive lines Vg1 and Vg3 is performed. In the case of the drive circuit 414 of the comparative example, the control signal DIO and the shift control signal CPV need to be supplied two times and three times, respectively, to activate the drive lines Vg1 and Vg3 at the beginning of the scanning of the drive lines Vg of the odd-numbered rows, as illustrated in FIG. 6. To change the drive lines Vg to be activated in the comparative example, the shift control signal CPV needs to be supplied four times while the control signal OE1 is off.

In contrast, in the present embodiment, the drive circuit 114 supplies one pulse of the shift control signal CPV for the control signal DIO. This causes an activation signal (conductive voltage Vcom) to be supplied to the output terminals connected to the drive lines Vg1 and Vg3 among the output terminals of the shift register 410, and then the control signal OE1 is supplied to the switch circuit unit 420 to activate the drive lines Vg1 and Vg3. This resets the pixels PIX connected to the drive line Vg1. After the control signal OE1 falls, the drive circuit 114 can supply the shift control signal CPV one time to select the drive lines Vg5 and Vg7 to be activated.

In this way, it is possible for the drive circuit 114 of the present embodiment to execute the operation involving the supply of the shift control signal CPV at speed four times faster than that of the drive circuit 414 of the comparative example. That is, the radiographic imaging apparatus 100 of the present embodiment can increase the speed of the dummy read operation compared with that of the comparative example using the drive circuit 414. Moreover, it is possible for the drive circuit 114 of the present embodiment to execute the operation involving the supply of the shift control signal CPV at ¼ of the speed of the drive circuit 414 of the comparative example. That is, the need of high-speed operation of the drive circuit 114 of the present embodiment can be reduced, and thus, the cost of manufacturing the radiographic imaging apparatus 100 can be reduced. As described above, a decrease in image quality caused by the resetting of the pixels PIX during the dummy read operation can be suppressed.

Figure 7:
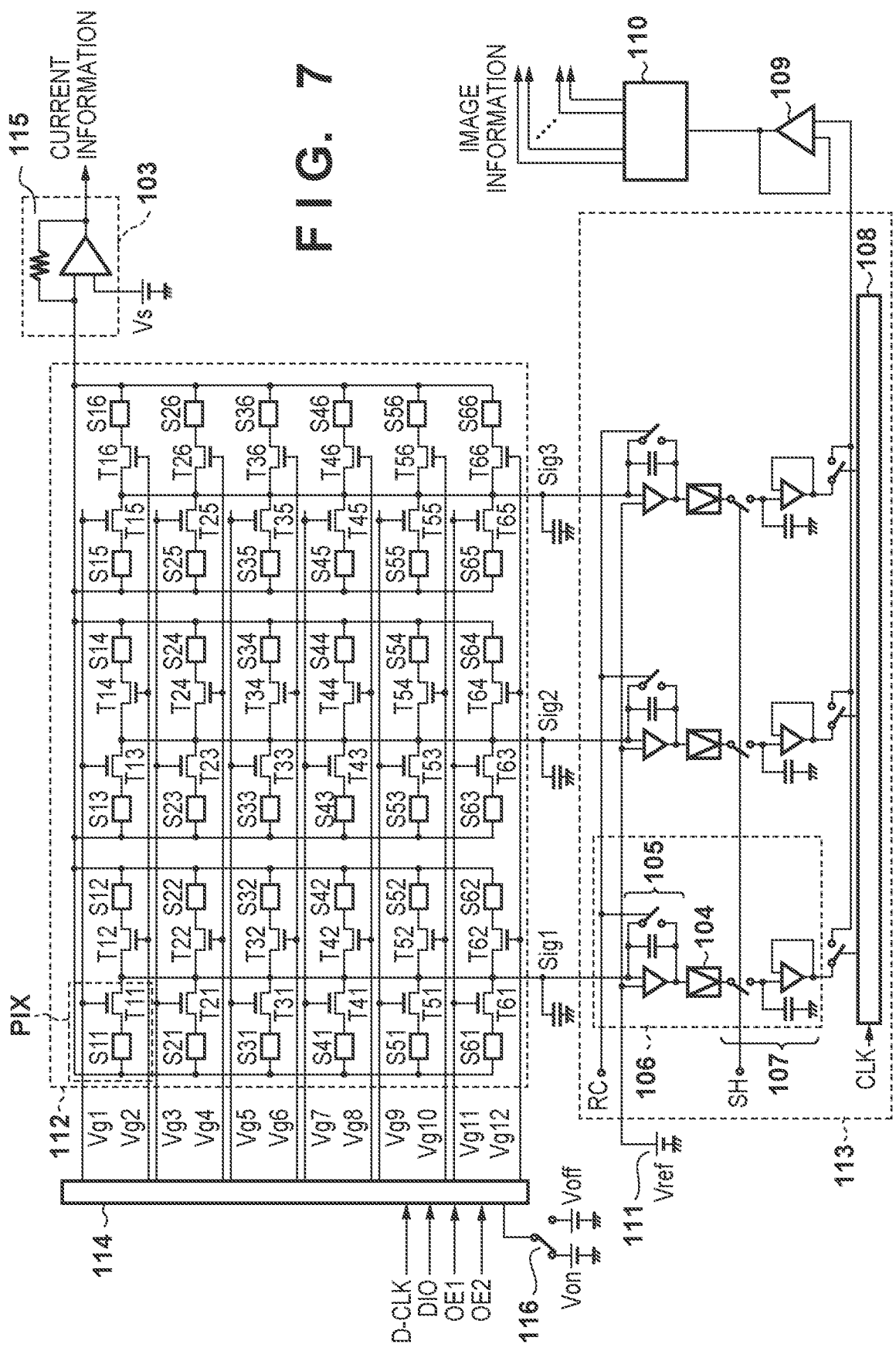
FIG. 7 is a diagram illustrating a configuration example of the radiographic imaging apparatus of FIG. 1.

FIG. 7 is a diagram illustrating a modification of the radiation detection unit 150 illustrated in FIG. 2. In the radiation detection unit 150 illustrated in FIG. 7, the number of drive lines Vg is doubled compared with that in the radiation detection unit 150 illustrated in FIG. 2, and the pixels PIX adjacent to each other in the row direction are connected to the different drive lines Vg. That is, the pixels PIX adjacent to each other in the row direction among the multiple pixels PIX belong to different pixel groups connected to different drive lines Vg. With this configuration, it is possible to independently control the readout of signals from the even-numbered columns and the odd-numbered columns in the dummy read operation and the readout operation. Details of the control method will be described later.

In the radiation detection unit 150 illustrated in FIG. 7, the pixels PIX adjacent to each other in the row direction among the multiple pixels PIX and belonging to different pixel groups share one signal line among the multiple column signal lines Sig. With this configuration, the number of the amplifier circuits 106 of the readout circuit 113 in the radiation detection unit 150 illustrated in FIG. 7 can be halved in comparison with that in the configuration illustrated in FIG. 2. That is, it is possible to suppress the cost of the manufacturing of the readout circuit 113. On the other hand, the time for reading out signals from the pixel unit 112 is about twice as long as that of the configuration illustrated in FIG. 2. Thus, the sharing of column signal lines Sig may be appropriately selected in accordance with the specifications required for the radiographic imaging apparatus 100.

Figure 8:
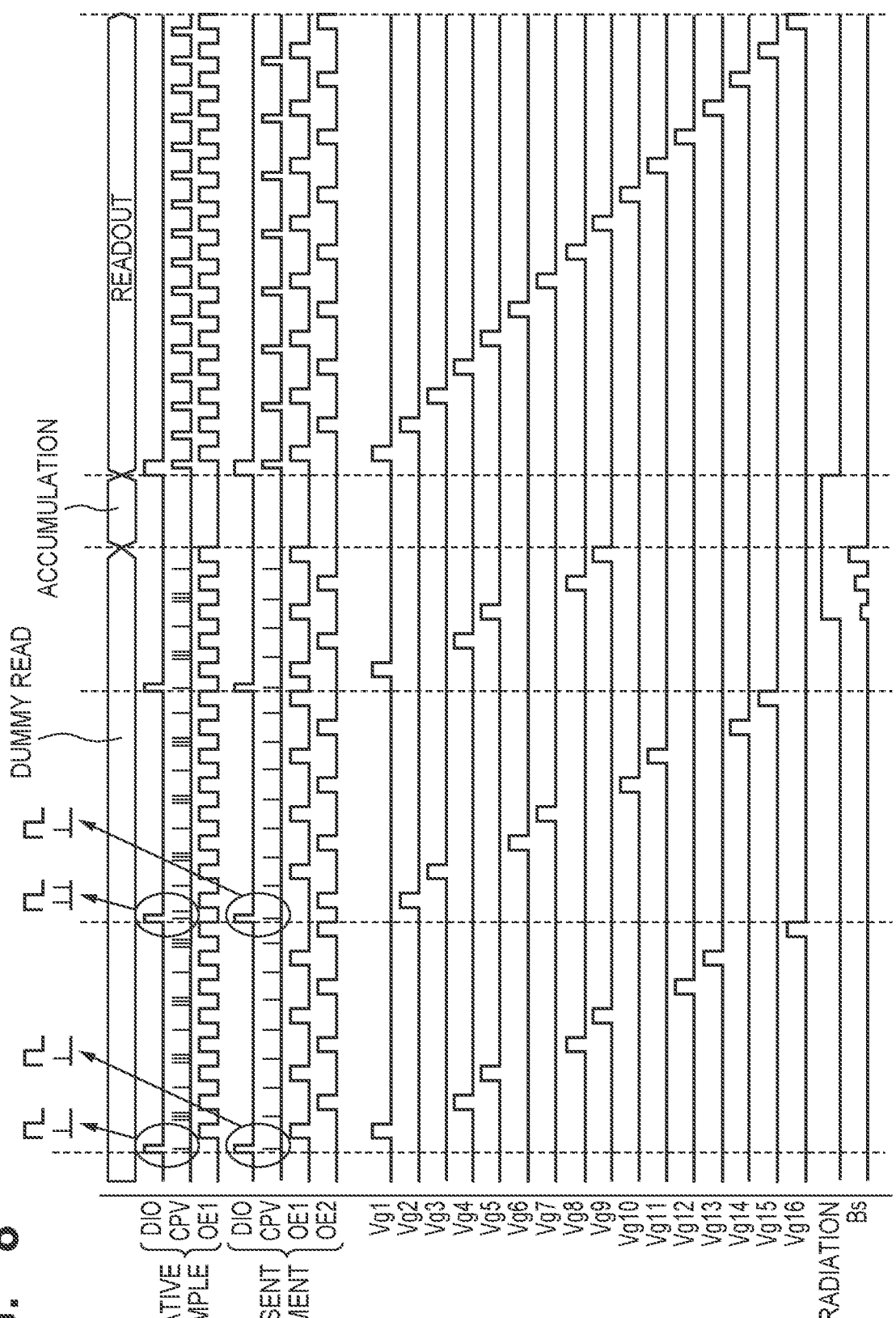
FIG. 8 is a timing diagram for explaining an operation of the radiographic imaging apparatus of FIG. 1.

FIG. 8 is a timing diagram illustrating the drive operation of the radiographic imaging apparatus 100 including the radiation detection unit 150 illustrated in FIG. 7. Similar to FIGS. 5 and 6, FIG. 8 illustrates the control signals DIO, OE1, and OE2, and the shift control signal CPV supplied to the drive circuit 114 of the present embodiment illustrated in FIGS. 4A and 4B. FIG. 8 further illustrates the control signals DIO and OE1 and the shift control signal CPV supplied to the drive circuit 414 of the comparative example illustrated in FIG. 4C.

In the present embodiment, the control signal OE1 is supplied after the shift control signal CPV being supplied one time, and the control signal OE2 is supplied after the shift control signal CPV is supplied the second time. As a result, unlike the drive operation explained with reference to FIG. 5, the drive lines Vg are activated in the following order: drive lines Vg1, Vg4, Vg5, Vg8, Vg9, Vg12, Vg13, Vg16, Vg2, Vg3, Vg6, Vg7, Vg10, Vg11, Vg14, and Vg15. In contrast, when the drive operation illustrated in FIG. 8 is executed by the drive circuit 414 of the comparative example, the selection of a drive line Vg by the shift control signal CPV being supplied three times and the selection of a drive line Vg by the shift control signal CPV being supplied one time are repeated. Thus, in the operation of the drive circuit 414 of the comparative example, the speed of the dummy read operation is determined by the shift control signal CPV being supplied three times. In other words, the drive circuit 114 of the present embodiment can execute the operation involving the supply of the shift control signal CPV at speed three times faster than that of the drive circuit 414 of the comparative example. As a result, the radiographic imaging apparatus 100 of the present embodiment can increase the speed of the dummy read operation compared with that of the comparative example using the drive circuit 414.

Moreover, it is possible for the drive circuit 114 of the present embodiment to execute the operation involving the supply of the shift control signal CPV at ⅓ of the speed of the drive circuit 414 of the comparative example. That is, the need of high-speed operation of the drive circuit 114 of the present embodiment can be reduced, and thus, the cost of manufacturing the radiographic imaging apparatus 100 can be reduced. Similar to the above-described embodiment, the radiographic imaging apparatus 100 of the present embodiment can suppress a decrease in image quality caused by resetting of the pixels PIX during the dummy read operation.

The correction for suppressing a decrease in image quality caused by the resetting the pixels PIX during the dummy read operation will now be explained with reference to FIGS. 9A to 9E. Artifacts presumed at the driving timings illustrated in FIG. 5 and corrections to the artifacts will now be described with reference to FIG. 9A.

As described above, the multiple pixels PIX are divided into at least two pixel groups connected to different drive lines Vg among the multiple drive lines Vg. In the arrangement of the pixels PIX illustrated in FIG. 2, the pixels PIX are divided into a pixel group connected to the drive lines Vg of the odd-numbered rows and a pixel group connected to the drive lines Vg of the even-numbered rows. As a result, the pixels adjacent to each other in the column direction (for example, the pixel PIX including the switching element T11 and the transducer S11 and the pixel PIX including the switching element T21 and the transducer S21) among the multiple pixels PIX belong to different pixel groups among at least two pixel groups. The pixels aligned along the two-pixel row direction (for example, the pixel PIX including the switching element T11 and the transducer S11 and the pixel PIX including the switching element T12 and the transducer S12) among the multiple pixels PIX belong to the same pixel group among the at least two pixel groups.

In the period of the dummy read operation up to when the detection unit 118 detects the start of radiation irradiation, the drive circuit 114 activates the drive lines Vg in each pixel group in a predetermined order and resets each pixel PIX. Through this operation, as illustrated in FIG. 5, the pixels PIX connected to the drive lines Vg5, Vg7, and Vg9 are reset during the period between the start of radiation irradiation and the detection of the start of radiation irradiation by the detection unit 118. As a result, artifacts such as those illustrated in FIG. 9A may appear due to signals output from the pixels PIX connected to the drive lines Vg5, Vg7, and Vg9. Such linear artifacts are corrected with signals of two pixels PIX adjacent to each other in the column direction among the pixels PIX connected to the drive lines Vg5, Vg7, and Vg9. That is, the line defect can be suppressed by not sequentially activating three or more drive lines Vg during the period of the dummy read operation up to when the detection unit 118 detects the start of radiation irradiation. In the case of the operation illustrated in FIG. 5, the correction can be made with the signals of the pixels PIX adjacent to each other in the column direction among the pixels PIX of the pixel group connected to the drive lines Vg of the odd-numbered rows or the even-numbered rows.

Consider the case where the radiation detection unit 150 illustrated in FIG. 2 executes a drive operation in which the control signals OE1 and OE2 are alternately supplied, and the drive lines Vg are activated in the following order: Vg1, Vg4, Vg5, Vg8, Vg9, Vg12, Vg13, Vg16, Vg2, Vg3, Vg6, Vg7, Vg10, Vg11, Vg14, Vg15. Even in such the case, deterioration of signals due to resetting does not occur in the pixels PIX on one side along the column direction of the pixels PIX in which artifacts may appear. Thus, for example, the signal of a pixel PIX connected to the drive line Vg5 can be corrected with the signal of one adjacent pixel PIX connected to the drive line Vg6 belonging to a pixel group different from that of the pixel connected to the drive line Vg5. Similarly, the signals of the pixels PIX connected to the drive lines Vg8 and Vg9 can be corrected with the signals of the pixels PIX connected to the drive lines Vg7 and Vg10, respectively.

Artifacts presumed at the driving timings illustrated in FIG. 8 and corrections to the artifacts will be now be described with reference to FIG. 9B. As described above, in the period of the dummy read operation up to when the detection unit 118 detects the start of radiation irradiation, the drive circuit 114 activates the drive lines Vg of each pixel group in a predetermined order. Thus, in the arrangement of the pixels PIX illustrated in FIG. 7, the pixels PIX are divided into a pixel group connected to the drive lines Vg1, Vg4, Vg5, Vg8, Vg9, Vg12, Vg13, and Vg16 and a pixel group connected to the drive lines Vg2, Vg3, Vg6, Vg7, Vg10, Vg11, Vg14, and Vg15. As a result, the pixels adjacent to each other in the column direction (for example, the pixel PIX including the switching element T11 and the transducer S11 and the pixel PIX including the switching element T21 and the transducer S21) among the multiple pixels PIX belong to different pixel groups among at least two pixel groups. The pixels aligned along the two-pixel row direction (for example, the pixel PIX including the switching element T11 and the transducer S11 and the pixel PIX including the switching element T12 and the transducer S12) among the multiple pixels PIX belong to different pixel groups among the at least two pixel groups. In the configuration examples illustrated in FIGS. 7 and 8, the at least two pixel groups include a first pixel group (for example, a pixel group including the pixel PIX including the switching element T11 and the transducer S11) and a second pixel group (for example, a pixel group including the pixel PIX including the switching element T21 and the transducer S21). Among the multiple pixels PIX, the pixels belonging to the first pixel group and the pixels belonging to the second pixel group are alternately arranged in the row direction. Also, among the multiple pixels, the pixels belonging to the first pixel group and the pixels belonging to the second pixel group are alternately arranged in the column direction.

In the period of the dummy read operation up to when the detection unit 118 detects the start of radiation irradiation, the drive circuit 114 activates the drive lines Vg in each pixel group in a predetermined order and resets each pixel PIX. Through this operation, as illustrated in FIG. 8, the pixels PIX connected to the drive lines Vg5, Vg7, and Vg9 are reset during the period between the start of radiation irradiation and the detection of the start of radiation irradiation by the detection unit 118. As a result, artifacts arranged in a checkered pattern such as those illustrated in FIG. 9B may appear due to signals output from the pixels PIX connected to the drive lines Vg5, Vg8, and Vg9. Such artifacts arranged in a checkered pattern are corrected with the signals of the four pixels PIX adjacent to each of the pixels PIX connected to the drive lines Vg5, Vg8, and Vg9 in the column and row directions.

In the correction in the configurations illustrated in FIGS. 7 and 8, the number of pixels PIX that can be used for correction is larger than that in the configurations illustrated in FIGS. 2 and 5. As a result, the artifacts can be corrected more precisely because the amount of information from the pixels PIX that are the correction source is increased.

Figure 9C:
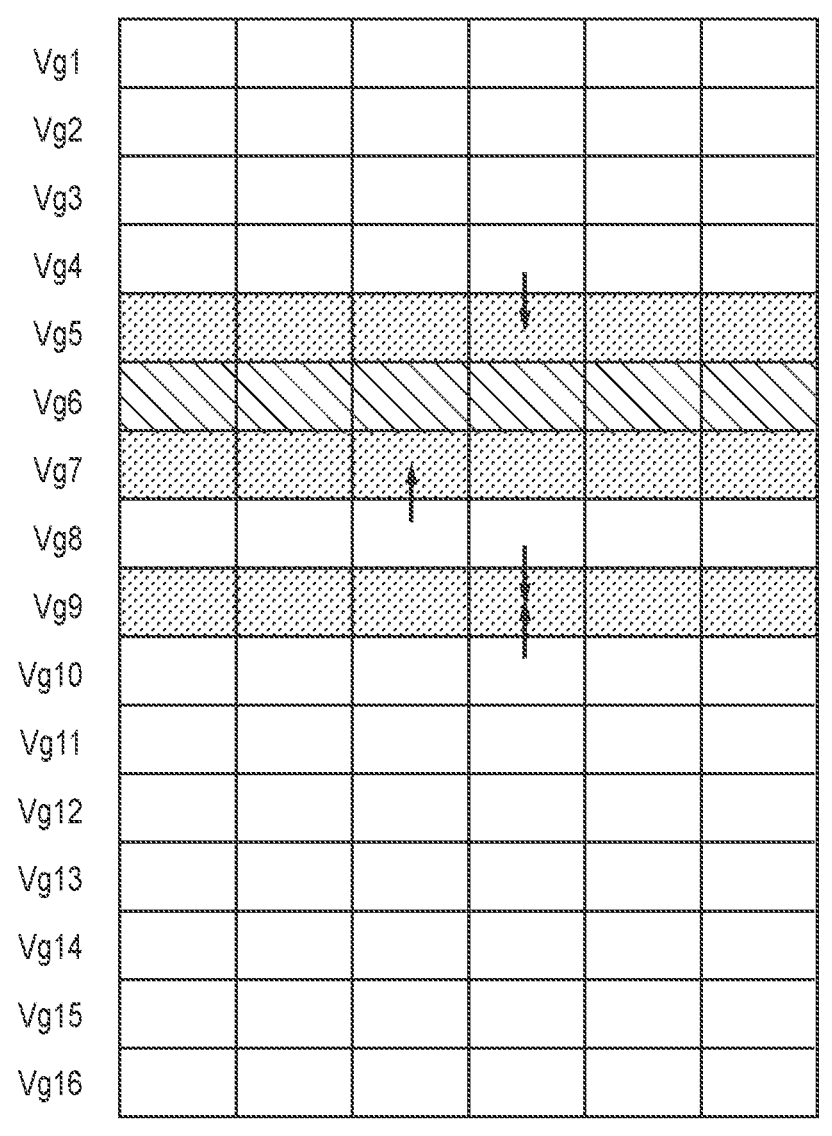

FIG. 9C illustrates a case of a line defect caused by a signal output from a pixel PIX connected to the drive line Vg6. When the drive operation illustrated in FIG. 5 is performed at this time, artifacts such as those illustrated in FIG. 9A appear due to signals output from pixels PIX connected to the drive lines Vg5, Vg7, and Vg9. In such a case, the signal output from the pixel PIX connected to the drive line Vg9 is corrected with the signals of the two pixels PIX connected to the drive lines Vg8 and Vg10 adjacent to the pixel connected to the drive line Vg9. The signals of the pixels PIX connected to the drive lines Vg5 and Vg7 are each corrected with the signal of one adjacent pixel. In such a case, the signals of the pixels PIX connected to the drive lines Vg5 and Vg7 may be equivalent to the signals of the pixels PIX connected to the drive lines Vg4 and Vg8, respectively. The signal of the pixel PIX connected to the drive line Vg6 is corrected with the signals of the pixels PIX connected to the drive lines Vg4 and Vg8, which are separated by two or more pixels. Thus, there is a possibility that the correction precision is reduced.

Figures 9D, 9E:
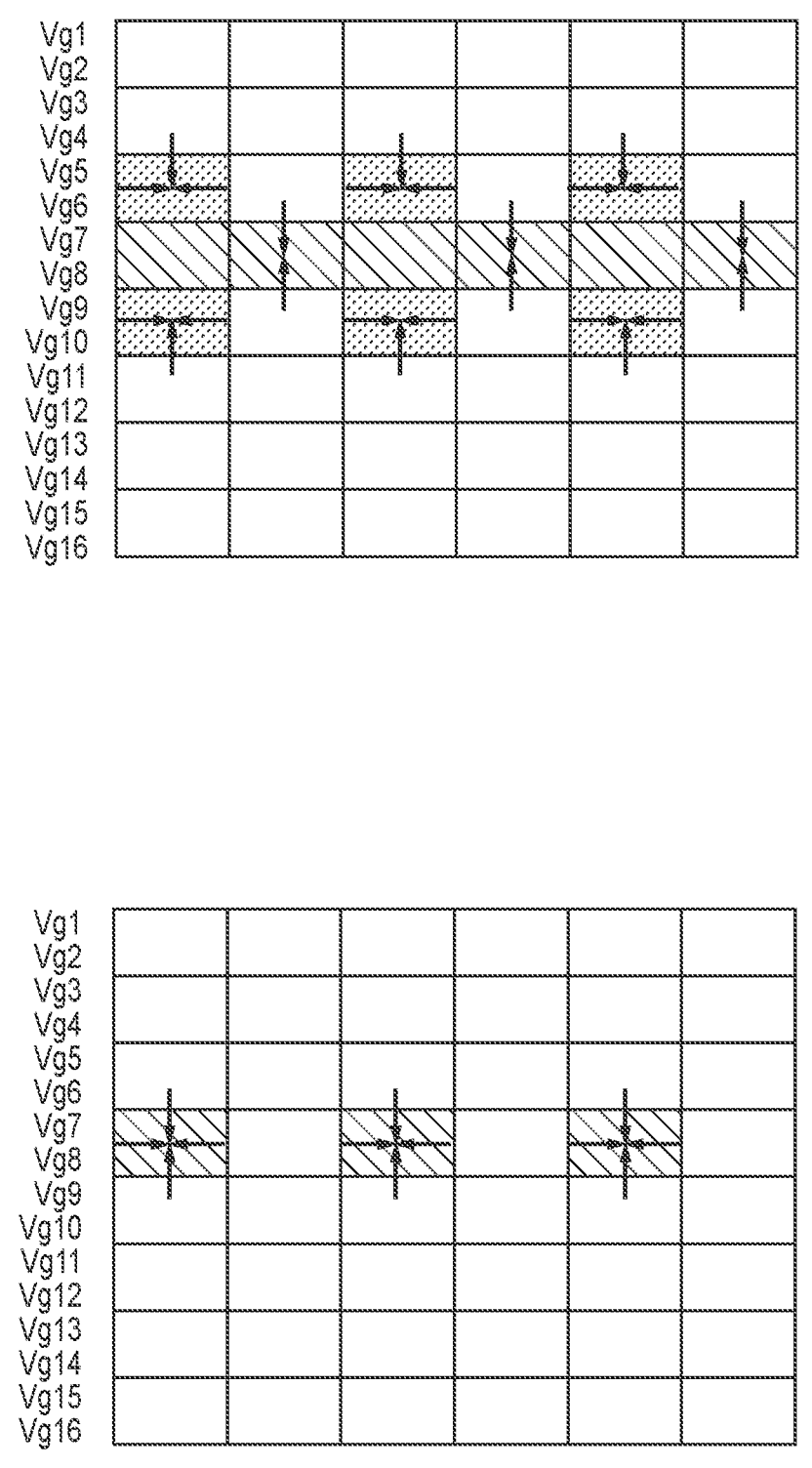

FIG. 9D illustrates a line defect caused by signals output from pixels PIX connected to the drive line Vg7 or Vg8 or both the drive lines Vg7 and Vg8. When the drive operation illustrated in FIG. 8 is performed at this time, artifacts similar to those illustrated in FIG. 9B appear due to the signals output from the pixels PIX connected to the drive lines Vg5, Vg8, and Vg9. In such a case, the signals output from the pixels PIX connected to the drive lines Vg5 and Vg9 are each corrected with the signals of the three adjacent pixel PIX, as shown in FIG. 9D. The signal of a pixel PIX connected to the drive line Vg8 is corrected with the signals of the two pixels PIX adjacent in the column direction. Artifacts appear in the pixels PIX adjacent in the column and row directions to the pixel PIX connected to the drive line Vg7. However, as illustrated in FIG. 9D, the signal values can be corrected with high precision as illustrated in FIG. 9E by using the signal values of the pixels PIX connected to the drive lines Vg5, Vg8, and Vg9 corrected with the signals of two or three adjacent pixels. In other words, when the configurations illustrated in FIGS. 7 and 8 are used, the amount of information (the number of pixels PIX) available for correction is large even if there is a line defect. Thus, artifacts can be corrected with higher precision.

Figure 10:
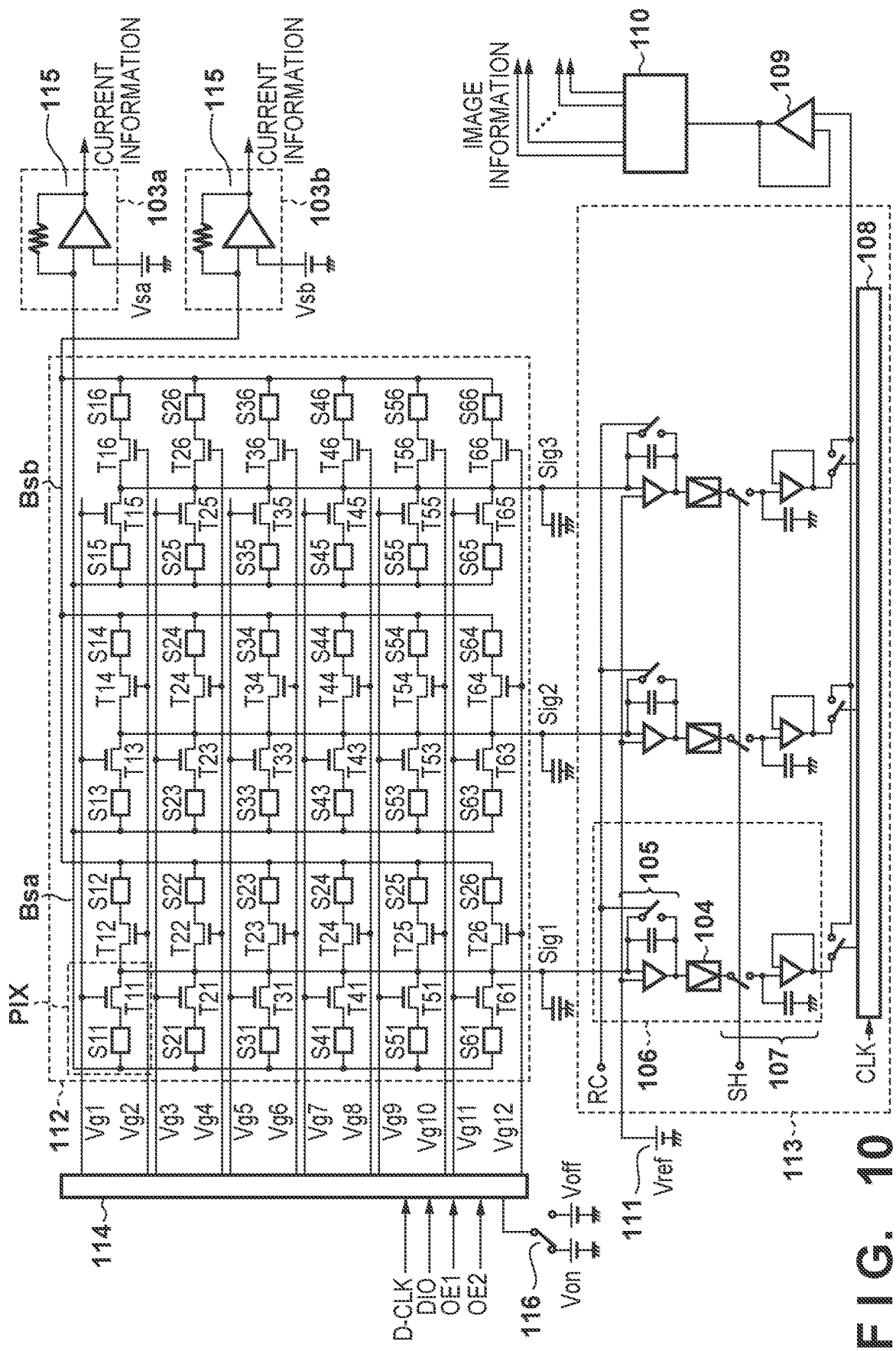
FIG. 10 is a diagram illustrating a configuration example of the radiographic imaging apparatus of FIG. 1.

FIG. 10 is a diagram illustrating a modification of the radiation detection unit 150 illustrated in FIG. 7. Unlike the radiation detection unit 150 illustrated in FIG. 7, the radiation detection unit 150 illustrated in FIG. 10 includes two bias sources: a bias source 103a for supplying a bias voltage Vsa and a bias source 103b for supplying a bias voltage Vsb. The bias source 103a supplies the bias voltage Vsa to the transducers S of the pixels PIX disposed in the odd-numbered columns through a bias line Bsa. The bias source 103b supplies the bias voltage Vsb to the transducers S of the pixels PIX disposed in the even-numbered columns through a bias line Bsb.

By providing the two bias sources 103a and 103b illustrated in FIG. 10, when the drive line Vg of an odd-numbered row is activated once radiation irradiation is started, a current Ivsa corresponding to radiation irradiation flows through the bias line Bsa to the bias source 103a. Similarly, when the drive line Vg of an even-numbered row is activated, a current Ivsb flows through the bias line Bsb to the bias source 103b. The detection unit 118 may detect the start of radiation irradiation on the basis of current information corresponding to the currents Ivsa and Ivsb output from the bias sources 103a and 103b, respectively. In other words, the bias sources 103a and 103b supply the bias voltages Vsa and Vsb to the transducers S of the pixels PIX through the electrically independent bias lines Bsa and Bsb the two pixel groups (a group of pixels PIX disposed in the odd-numbered columns and a group of pixels PIX disposed in the even-numbered columns in the configuration of FIG. 10). In this case, a first signal value and a second signal value are sampled. The first signal value (current information) indicates the current Ivsa flowing through the bias line Bsa connected to the pixel group including pixels PIX connected to the activated drive line Vg (here, the drive line Vg of an odd-number row) among the multiple drive lines Vg (the group of pixels PIX disposed in an odd-numbered column). The second signal value indicates the current Ivsb flowing through the bias line Bsb connected to the pixel group not including pixels connected to the activated drive line Vg (the group of pixels PIX disposed in an even-numbered column). The detection unit 118 may determine the start of radiation irradiation on the basis of the first and second signal values. At this time, the detection unit 118 may acquire the first and second signal values so that at least some of the sampling timings overlaps.

The detection unit 118 can acquire current information corresponding to changes in the currents Ivsa and Ivsb caused by the start of radiation irradiation from the bias sources 103a and 103b, independently. For example, if either the current information indicating the current Ivsa or the current information indicating the current Ivsb exceeds a predetermined threshold value, the detection unit 118 may determine the start of radiation irradiation. Such determination allows the detection unit 118 to more quickly detect the start of radiation irradiation. Alternatively, for example, if both of the current information indicating the current Ivsa and the current information indicating the current Ivsb exceed a predetermined threshold value, the detection unit 118 may determine the start of radiation irradiation. Such determination allows the detection unit 118 to suppress erroneous determination. Alternatively, for example, if the difference between the current information indicating the current Ivsa and the current information indicating the current Ivsb exceeds a predetermined threshold value, the detection unit 118 may determine the start of radiation irradiation. By obtaining the difference between the two pieces of current information, it is possible to remove electromagnetic noise, shock, vibration, or other noise commonly applied to the bias lines Bsa and Bsb, and to suppress erroneous determination caused by such noise. When the sum of the current information indicating the current Ivsa and the current information indicating the current Ivsb exceeds a predetermined threshold value, the detection unit 118 may determine the start of radiation irradiation. In such a case, the detection unit 118 can detect the start of radiation irradiation as in the case where there is one bias source 103.

In the configuration illustrated in FIG. 10, the detection unit 118 detects the start of radiation irradiation from current information indicating the currents Ivsa and Ivsb flowing through the electrically independent bias lines Bsa and Bsb, respectively. Thus, the radiographic imaging apparatus 100 can detect the presence or absence of radiation, e.g., the start of radiation irradiation, with high precision.

Figure 11:
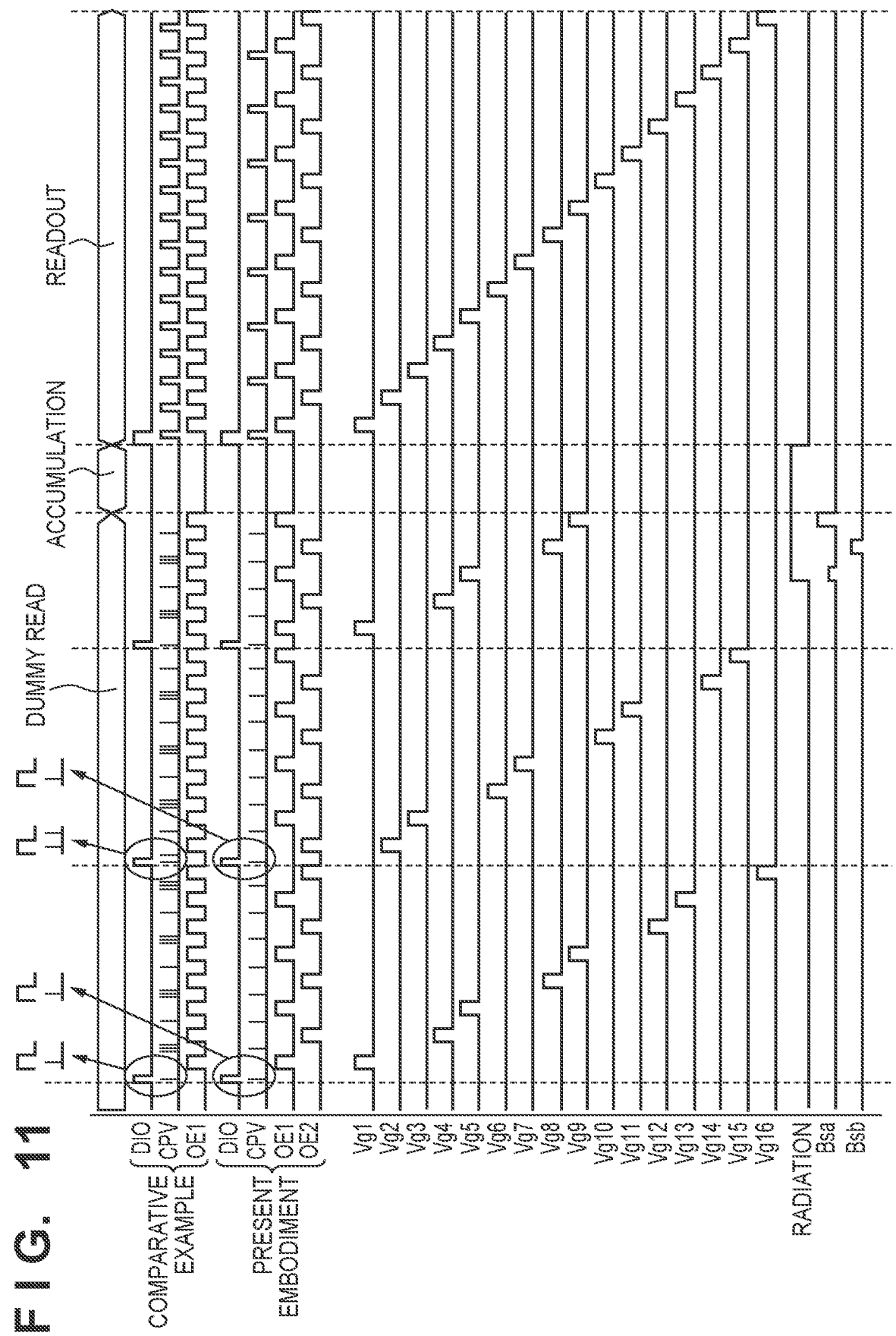
FIG. 11 is a timing diagram for explaining an operation of the radiographic imaging apparatus of FIG. 1.

FIG. 11 is a timing diagram illustrating the drive operation of the radiographic imaging apparatus 100 including the radiation detection unit 150 illustrated in FIG. 10. The timing diagram in FIG. 11 differs from the timing diagram in FIG. 8 in that the currents flowing through the bias lines Bsa and Bsb are also illustrated, as described with reference to FIG. 10. Specifically, the current value of the bias line Bsa changes when the drive lines Vg5 and Vg9 are activated, and the current value of the bias line Bsb changes when the drive line Vg8 is activated, after the start of radiation irradiation. In the timing diagram in FIG. 11, the detection unit 118 detects the start of radiation irradiation at the timing when the drive line Vg9 is activated.

In the timing diagram in FIG. 11, the operation of the drive circuit 114 may be the same as that in the timing diagram in FIG. 8, except that the detection unit 118 detects the presence or absence of radiation. Although the detailed description is omitted here, similar to the operation of the drive circuit 114 illustrated in FIG. 8, the drive circuit 114 of the present embodiment can execute the operation involving the supply of the shift control signal CPV at speed three times faster than that of the drive circuit 414 of the comparative example. As a result, the radiographic imaging apparatus 100 of the present embodiment can increase the speed of the dummy read operation compared with that of the comparative example using the drive circuit 414. Moreover, it is possible for the drive circuit 114 of the present embodiment to execute the operation involving the supply of the shift control signal CPV at ⅓ of the speed of the drive circuit 414 of the comparative example. That is, the need of high-speed operation of the drive circuit 114 of the present embodiment can be reduced, and thus, the cost of manufacturing the radiographic imaging apparatus 100 can be reduced. As described above with reference to FIGS. 9A to 9E, the radiographic imaging apparatus 100 of the present embodiment can suppress a decrease in image quality caused by the resetting of pixels PIX during the dummy read operation.

Figure 12:
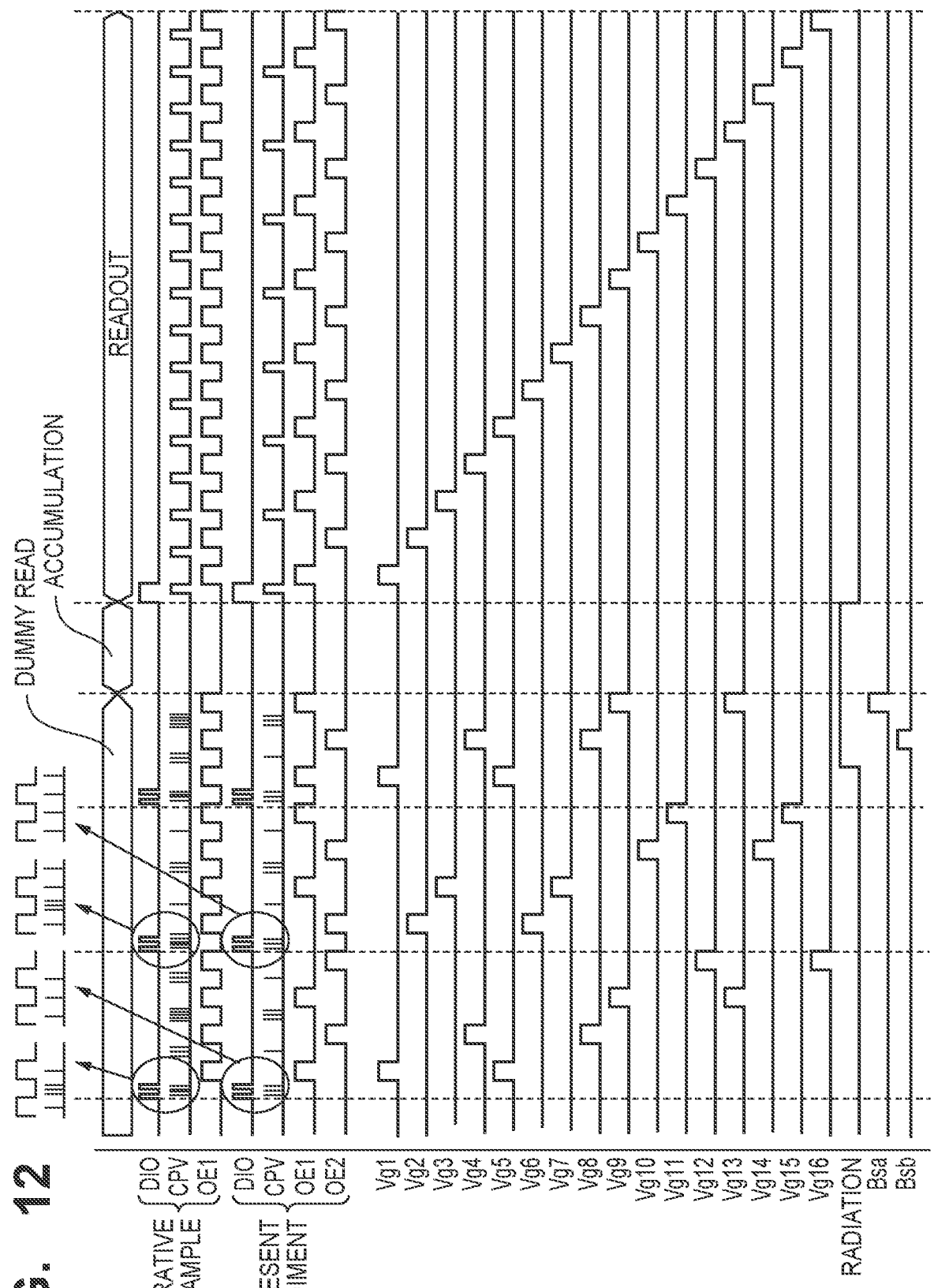
FIG. 12 is a timing diagram for explaining an operation of the radiographic imaging apparatus of FIG. 1.

Similar to the relationship between the timing diagram in FIG. 5 and the timing diagram in FIG. 6, the drive circuit 114 may simultaneously activate two or more drive lines Vg among the multiple drive lines Vg during the period of dummy read operation, as illustrated in the timing diagram in FIG. 12. In the drive operation illustrated in FIG. 12, two drive lines Vg are simultaneously activated during the period of dummy read operation up to when the detection unit 118 detects the start of radiation irradiation. Thus, the pixel unit 112 can be scanned (dummy read operation) at a frame rate twice as high as that of the drive operation illustrated in FIG. 11. Since the number of drive lines Vg activated is doubled, the number of switching elements T to be turned on is doubled, and the amount of current flowing through the bias lines Bsa and Bsb can be doubled. That is, the detection unit 118 can detect the start of radiation irradiation in a shorter time even if the radiation is weak. This shortens the period between the start of radiation irradiation by the radiation generating device 123 and the detection of the radiation by the detection unit 118, and reduces the number of pixel rows to be reset during this period. That is, it is possible to suppress a decrease in image quality caused by the resetting of the pixels PIX during the dummy read operation.

In each of the timing diagrams in FIGS. 5, 6, 8, 11, and 12, the drive circuit 114 sequentially activates multiple drive lines Vg after the end of radiation irradiation, to output radiographic image signals from the multiple pixels PIX. At this time, as illustrated in FIGS. 5, 6, 8, 11, and 12, the order of activation of the drive lines Vg may be different between the period up to when the detection unit 118 detects the start of radiation irradiation and the period after the end of the radiation irradiation. For example, as illustrated in FIGS. 5, 6, 8, 11, and 12, the drive circuit 114 may activate the drive lines Vg one by one in order along the column direction after the end of radiation irradiation. In such a case, the drive circuit 114 of the present embodiment can halve the speed at which the control signals OE1 and OE2 and the shift control signal CPV are supplied, compared with the drive circuit 414 of the comparative example, even in the readout operation for outputting radiographic image signals. In other words, it is possible to suppress the operating speed of the drive circuit 114 not only in the dummy read operation during the period in which the detection unit 118 detects the start of radiation irradiation, but also in the readout operation. This can reduce the cost of the manufacturing process of the drive circuit 114.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-069922, filed Apr. 16, 2021 which is hereby incorporated by reference herein in its entirety.

What is claimed is:

1. A radiographic imaging apparatus comprising:
a plurality of pixels disposed to form a plurality of rows and a plurality of columns;
a drive circuit configured to control the plurality of pixels through a plurality of drive lines extending in a row direction; and
a detection unit configured to detect a start of radiation irradiation, wherein,
the drive circuit comprises a shift circuit configured to perform a shift operation of changing the drive line to be activated, among the plurality of drive lines, in response to a shift control signal input to the drive circuit, and
the drive circuit has a mode of activating a second drive line among the plurality of drive lines in response to the shift control signal input for a second time after a first drive line among the plurality of drive lines is activated during a period up to when the detection unit detects the start of radiation irradiation, at least two drive lines of the plurality of drive lines being disposed between the first drive line and the second drive line.

2. The radiographic imaging apparatus according to claim 1, wherein the shift circuit is configured to activate drive lines not adjacent to each other among the plurality of drive lines in response to the shift control signal input one time.

3. The radiographic imaging apparatus according to claim 1, wherein at least three drive lines of the plurality of drive lines are disposed between the first drive line and the second drive line.

4. The radiographic imaging apparatus according to claim 1, wherein,
the shift circuit comprises:
a plurality of output terminals configured to output an activation signal for activating the plurality of drive lines;
a shift register configured to shift the output terminal outputting the activation signal in response to an input of the shift control signal; and
a switch circuit unit disposed between the plurality of output terminals and the plurality of drive lines,
at least two drive lines of the plurality of drive lines are connected to one output terminal of the plurality of output terminals through the switch circuit unit, and
the switch circuit unit is configured to supply the activation signal to the at least two drive lines independently.

5. The radiographic imaging apparatus according to claim 1, wherein,
the shift circuit comprises:
a plurality of output terminals configured to output an activation signal for activating the plurality of drive lines;
at least two shift registers configured to shift the output terminal outputting the activation signal in response to an input of a common shift control signal; and
a switch circuit unit disposed between the at least two shift registers and the plurality of drive lines, and the switch circuit unit is configured to select one of the two shift registers to output, to the corresponding drive line among the plurality of drive lines, an activation signal for activating each of the drive lines.

6. The radiographic imaging apparatus according to claim 1, wherein,
the plurality of pixels is divided into at least two pixel groups connected to different drive lines among the plurality of drive lines,
the drive circuit is configured to activate the plurality of drive lines in a predetermined order in each of the pixel groups during the period up to when the detection unit detects the start of radiation irradiation, and
pixels, among the plurality of pixels, adjacent to each other in a column direction belong to different pixel groups of the at least two pixel groups.

7. The radiographic imaging apparatus according to claim 6, wherein pixels, among the plurality of pixels, arrayed along the row direction belong to the same pixel group among the at least two pixel groups.

8. The radiographic imaging apparatus according to claim 6, wherein pixels, among the plurality of pixels, adjacent to each other in the row direction belong to different pixel groups among the at least two pixel groups.

9. The radiographic imaging apparatus according to claim 8, wherein,
the at least two pixel groups comprise a first pixel group and a second pixel group,
pixels, among the plurality of pixels, belonging to the first pixel group and pixels, among the plurality of pixels, belonging to the second pixel group are alternately disposed along the row direction, and
pixels, among the plurality of pixels, belonging to the first pixel group and pixels, among the plurality of pixels, belonging to the second pixel group are alternately disposed along the column direction.

10. The radiographic imaging apparatus according to claim 8, further comprising:
a plurality of column signal lines, extending in the column direction, from which signals are output from the plurality of pixels,
wherein pixels, among the plurality of pixels, disposed adjacent to each other in the row direction and belonging to different pixel groups from each other share one signal line of the plurality of column signal lines.

11. The radiographic imaging apparatus according to claim 6, wherein the drive circuit is configured to simultaneously activate two or more drive lines, among the plurality of drive lines, connected to pixels belonging to the same pixel group during the period up to when the detection unit detects the start of radiation irradiation.

12. The radiographic imaging apparatus according to claim 11, wherein,
the two or more drive lines connected to the pixels belonging to the same pixel group comprise the first drive line and a third drive line,
the third drive line is disposed closer to the second drive line than the first drive line is, and
a drive line of the plurality of drive lines is disposed between the first drive line and the third drive line.

13. The radiographic imaging apparatus according to claim 6, further comprising:
a bias source, wherein,
each pixel of the plurality of pixels includes a transducer that converts radiation to an electrical charge,
the bias source supplies a bias voltage to the transducers through electrically independent bias lines in one-to-one correspondence with the at least two pixel groups, and
the detection unit is configured to detect the start of radiation irradiation based on a current flowing through the bias lines.

14. The radiographic imaging apparatus according to claim 13, wherein,
in detection of the start of radiation irradiation,
the detection unit is configured to acquire a first signal value and a second signal value at sampling timings at least partially overlapping each other, the first signal value indicating a current flowing through the bias line connected to a pixel group including pixels connected to an activated drive line among the plurality of drive lines, and the second signal value indicating a current flowing through the bias line connected to a pixel group not including pixels connected to an activated drive line among the plurality of drive lines, and
the detection unit is configured to determine the start of radiation irradiation based on the first signal value and the second signal value.

15. The radiographic imaging apparatus according to claim 1, further comprising:
a bias source, wherein,
each pixel of the plurality of pixels includes a transducer configured to convert radiation to an electrical charge,
the bias source is configured to supply a bias voltage to the transducers through a bias line, and
the detection unit is configured to detect the start of radiation irradiation based on a current flowing through the bias line.

16. The radiographic imaging apparatus according to claim 1, wherein,
after the radiation irradiation ends, the drive circuit is configured to sequentially activate the drive lines to cause radiographic image signals to be output from the pixels, and
the order of activation of the drive lines differs between the period up to when the detection unit detects the start of radiation irradiation and after the radiation irradiation ends.

17. The radiographic imaging apparatus according to claim 1, wherein after the radiation irradiation ends, the drive circuit is configured to activate the drive lines one by one in order in the column direction.

18. A radiographic imaging system comprising:
the radiographic imaging apparatus according to claim 1; and
a processor that processes a signal output from the radiographic imaging apparatus.

19. A radiographic imaging system comprising:
a plurality of pixels disposed to form a plurality of rows and a plurality of columns;
a drive circuit configured to control the plurality of pixels through a plurality of drive lines extending in a row direction;
a detection unit configured to detect a start of radiation irradiation; and
a bias source, wherein
each of the plurality of pixels comprises a transducer that converts radiation to an electrical charge,
the plurality of pixels are divided into at least two pixel groups connected to different drive lines among the plurality of drive lines, the drive circuit is configured to activate the plurality of drive lines in a predetermined order in each of the pixel groups during the period up to when the detection unit detects the start of radiation irradiation, pixels, among the plurality of pixels, adjacent to each other in a column direction belong to different pixel groups of the at least two pixel groups, pixels, among the plurality of pixels, adjacent to each other in a row direction belong to different pixel groups of the at least two pixel groups, the bias source is configured to supply a bias voltage to the transducers through electrically independent bias lines in one-to-one correspondence with the at least two pixel groups, and the detection unit is configured to detect the start of radiation irradiation based on a current flowing through the bias line.

* * * * *